US012556682B2

(12) United States Patent
Hu

(10) Patent No.: US 12,556,682 B2
(45) Date of Patent: Feb. 17, 2026

(54) METHOD AND APPARATUS FOR DETERMINING CANDIDATE MOTION INFORMATION LIST, ELECTRONIC DEVICE, AND STORAGE MEDIUM

(71) Applicant: Tencent Technology (Shenzhen) Company Limited, Shenzhen (CN)

(72) Inventor: Ye Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 318 days.

(21) Appl. No.: 17/948,094

(22) Filed: Sep. 19, 2022

(65) Prior Publication Data

US 2023/0016630 A1   Jan. 19, 2023

Related U.S. Application Data

(63) Continuation of application No. PCT/CN2021/118839, filed on Sep. 16, 2021.

(30) Foreign Application Priority Data

Oct. 18, 2020 (CN) .......................... 202011114059.5

(51) Int. Cl.
*H04N 19/105* (2014.01)
*H04N 19/136* (2014.01)
*H04N 19/176* (2014.01)

(52) U.S. Cl.
CPC ......... *H04N 19/105* (2014.11); *H04N 19/136* (2014.11); *H04N 19/176* (2014.11)

(58) Field of Classification Search
CPC ... H04N 19/105; H04N 19/136; H04N 19/176
(Continued)

(56) References Cited

U.S. PATENT DOCUMENTS

2017/0238001 A1\* 8/2017 Li .......................... H04N 19/70
2020/0059651 A1\* 2/2020 Lin ....................... H04N 19/149
(Continued)

FOREIGN PATENT DOCUMENTS

CN    110460859 A    11/2019
CN    110519600 A    11/2019
(Continued)

OTHER PUBLICATIONS

Jianle Chen et al., "Algorithm Description for Versatile Video Coding and Test Model 6 (VTM 6)", Joint Video Experts Team (JVET) of ITU-T SG 16 WP 3 and ISO/IEC JTC I/SC 29/WG 11 15th Meeting: Gothenburg, SE, Jul. 3-12, 2019, Document: Document: JVET-O2002-v2, 87 pgs.
(Continued)

*Primary Examiner* — Rebecca A Volentine
*Assistant Examiner* — Jimmy S Lee
(74) *Attorney, Agent, or Firm* — Morgan, Lewis & Bockius LLP

(57) ABSTRACT

This application provides a method for determining a candidate motion information list for a current codec block, including: determining a target motion information list and a historical motion information table for the current codec block; and obtaining, when the target motion information list is not full, at least one piece of motion information based on the historical motion information table, and filling the candidate motion information list based on the at least one piece of motion information, the candidate motion information list being used for providing candidate predicted displacement vectors for the current codec block. This application further provides an apparatus for determining a candidate motion information list, an electronic device, a storage medium, and a computer program product.

16 Claims, 14 Drawing Sheets

(58) Field of Classification Search
USPC .................................................. 375/240.02
See application file for complete search history.

(56) References Cited

U.S. PATENT DOCUMENTS

| | | | | |
|---|---|---|---|---|
| 2020/0099951 | A1* | 3/2020 | Hung | H04N 19/159 |
| 2020/0112741 | A1* | 4/2020 | Han | H04N 19/513 |
| 2020/0137398 | A1* | 4/2020 | Zhao | H04N 19/517 |
| 2020/0404342 | A1* | 12/2020 | Kotra | H04N 19/174 |
| 2022/0109835 | A1* | 4/2022 | Lee | H04N 19/54 |
| 2022/0217356 | A1* | 7/2022 | Jiang | H04N 19/52 |

FOREIGN PATENT DOCUMENTS

| | | |
|---|---|---|
| CN | 110545424 A | 12/2019 |
| CN | 111010579 A | 4/2020 |
| CN | 111567045 A | 8/2020 |
| CN | 111698507 A | 9/2020 |
| WO | WO 2020006969 A1 | 1/2020 |

OTHER PUBLICATIONS

Jianle Chen et al., "Algorithm Description for Versatile Video Coding and Test Model 13 (VTM 13)", Joint Video Experts Team (JVET) of ITU-T SG 16 WP 3 and ISO/IEC JTC 1/SC 29 22nd Meeting, Document: JVET-V2002-v1, 102 pgs.
Tencent Technology, Extended European Search Report and Supplementary Search Report, EP21879196.0, Aug. 1, 2023, 13 pgs.
Xianglin Wang et al., "CE4-related: An Improved Method for Triangle Merge List Construction", Joint Video Experts Team (JVET) of ITU-T SG 16 WP 3 and ISO/IEC JTC 1/SC 29/WG 11 14th Meeting: Geneva, CH, Mar. 19-27, 2019, Document: JVET-N0340, 3 pgs.
Xiaozhong Xu et al., "CES-Related: Combination Test of JVET-N0176/JVET-N0317/JVET-N0382 on Simplification of IBC Vector Prediction", Joint Video Experts Team (JVET) of ITU-T SG 16 WP 3 and ISO/IEC JTC 1/SC 29/WG 11 14th Meeting: Geneva, CH, Mar. 19-27, 2019, Document: JVET-N0843-vl, 11 pgs.
Tencent Technology, WO, PCT/CN2021/118839, Dec. 14, 2021, 4 pgs.
Tencent Technology, IPRP, PCT/CN2021/118839, Apr. 13, 2023, 5 pgs.
Tencent Technology, ISR, PCT/CN2021/118839, Dec. 14, 2021, 2 pgs.

* cited by examiner

METHOD AND APPARATUS FOR DETERMINING CANDIDATE MOTION INFORMATION LIST, ELECTRONIC DEVICE, AND STORAGE MEDIUM

CROSS-REFERENCE TO RELATED APPLICATIONS

This application is a continuation application of PCT Patent Application No. PCT/CN2021/118839, entitled "CANDIDATE MOTION INFORMATION LIST DETERMINATION METHOD AND APPARATUS, AND ELECTRONIC DEVICE AND STORAGE MEDIUM" filed on Sep. 16, 2021, which claims priority to Chinese Patent Application No. 202011114059.5, filed with the State Intellectual Property Office of the People's Republic of China on Oct. 18, 2020, and entitled "A CANDIDATE MOTION INFORMATION LIST DETERMINATION METHOD AND APPARATUS, AN ELECTRONIC DEVICE, AND A STORAGE MEDIUM", all of which are incorporated herein by reference in their entirety.

FIELD OF THE TECHNOLOGY

This application relates to video coding technologies, and in particular, to a method and apparatus for determining a candidate motion information list, an electronic device, a storage medium, and a computer program product.

BACKGROUND OF THE DISCLOSURE

In the related art, in the process of video compression, such as Versatile Video Coding (VVC) and Audio Video coding Standard 3 (AVS3), a video codec usually needs to construct a motion information list to derive a predicted displacement vector.

However, when the motion information list does not have sufficient displacement vectors, the motion information list cannot provide an effective predicted displacement vector, which affects the video compression performance and cannot effectively reduce the volume of the compressed video, and is thus disadvantageous to the user experience.

SUMMARY

In view of this, the embodiments of this application provide a method and apparatus for determining a candidate motion information list, an electronic device, a storage medium, and a computer program product, which can obtain at least one piece of motion information based on a historical motion information table, and fill a candidate motion information list based on the at least one piece of motion information, to obtain a better displacement vector prediction effect and improve the video compression performance.

An embodiment of this application provides a method for determining a candidate motion information list for a current codec block, including:

determining a target motion information list and a historical motion information table for the current codec block, the historical motion information table being used for at least one of inter prediction, intra prediction, intra block copy (IBC) prediction, or intra string copy (ISC) prediction; and obtaining, when the target motion information list is not full, at least one piece of motion information based on the historical motion information table, and filling the candidate motion information list based on the at least one piece of motion information, the candidate motion information list being used for providing candidate predicted displacement vectors for the current codec block.

An embodiment of this application further provides a method for determining a candidate motion information list for a current codec block, including:

determining a position relationship between a historical motion information table and a spatial domain motion information list for the current codec block; and obtaining, when a target motion information list is not full, at least one piece of motion information based on at least one of the historical motion information table or the spatial domain motion information list, and filling the candidate motion information list based on the at least one piece of motion information, the candidate motion information list being used for providing candidate predicted displacement vectors for the current codec block.

An embodiment of this application further provides an apparatus for determining a candidate motion information list for a current codec block, including:

a first information processing module, configured to determine a target motion information list and a historical motion information table for the current codec block, the historical motion information table being used for at least one of inter prediction, intra prediction, intra block copy prediction, or intra string copy prediction; and a first information filling module, configured to obtain, when the target motion information list is not full, at least one piece of motion information based on the historical motion information table, the first information filling module being configured to fill the candidate motion information list based on the at least one piece of motion information, and the candidate motion information list being used for providing candidate predicted displacement vectors for the current codec block.

An embodiment of this application further provides an apparatus for determining a candidate motion information list, including:

a second information processing module, configured to determine a position relationship between a historical motion information table and a spatial domain motion information list for a current codec block; and a second information filling module, configured to obtain, when a target motion information list is not full, at least one piece of motion information based on at least one of the historical motion information table or the spatial domain motion information list, and fill the candidate motion information list based on the at least one piece of motion information, the candidate motion information list being used for providing candidate predicted displacement vectors for the current codec block.

An embodiment of this application further provides an electronic device, including:

a memory, configured to store executable instructions; and a processor, configured to implement, when executing the executable instructions stored in the memory, the method for determining a candidate motion information list for a current codec block provided in the embodiments of this application.

An embodiment of this application further provides a non-transitory computer-readable storage medium, storing executable instructions, the executable instructions, when executed by a processor, implementing the method for determining a candidate motion information list for a current codec block provided in the embodiments of this application.

In the embodiments of this application, the target motion information list and a quantity of displacement vectors in the historical motion information table are determined; and when the target motion information list is not full, at least one piece of motion information is obtained based on the historical motion information table, and the candidate motion information list is filled based on the at least one piece of motion information, the candidate motion information list being used for providing candidate predicted displacement vectors for a current codec block. In this way, more and more effective displacement vectors can be provided in the candidate motion information list, to obtain a better displacement vector prediction effect, improve the video compression performance, and improve the user experience.

DESCRIPTION OF EMBODIMENTS

Figure 1:
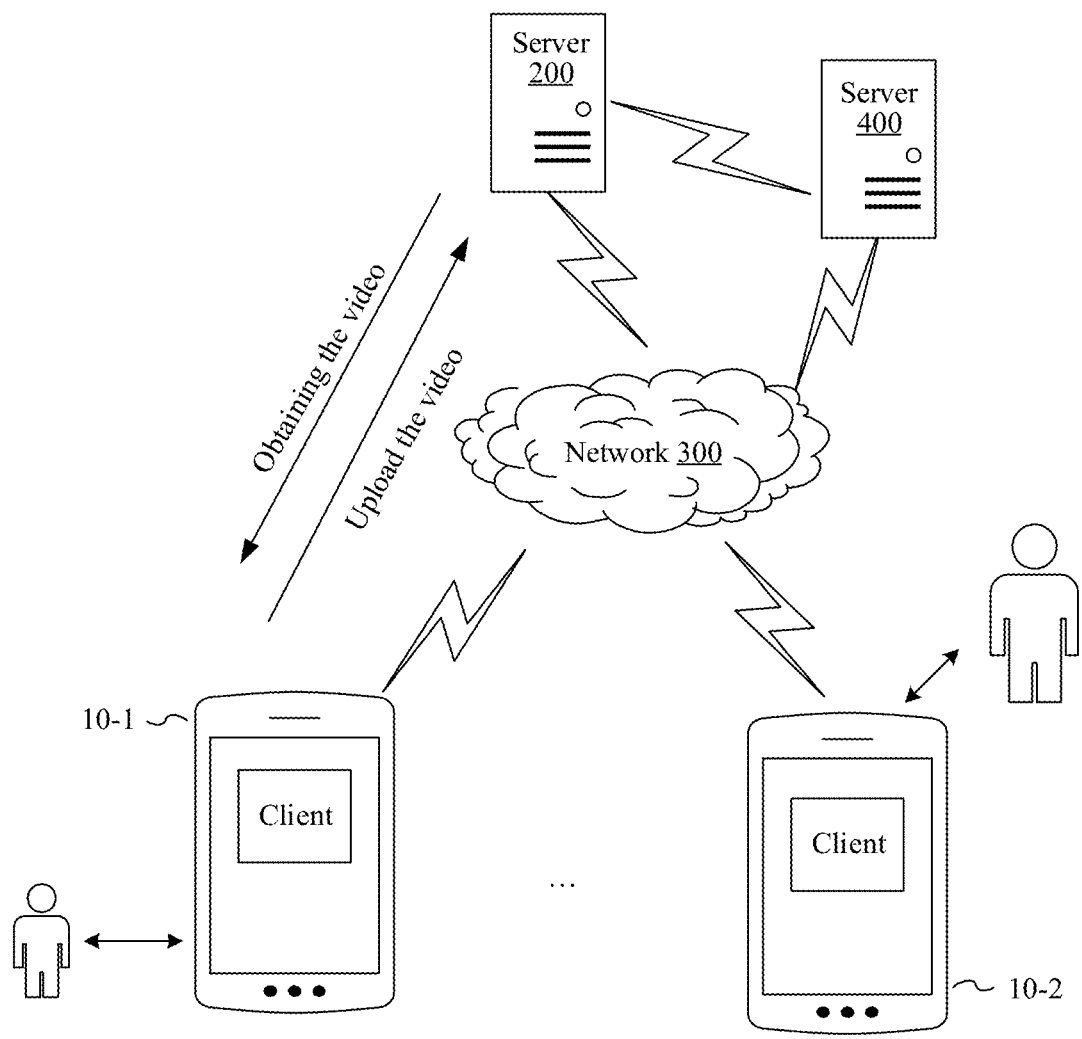
FIG. 1 is a schematic diagram of a use scenario of a list determining method according to an embodiment of this application.

To make the objectives, technical solutions, and advantages of this application clearer, the following describes this application in detail in some embodiments with reference to the accompanying drawings. The described embodiments are not to be considered as a limitation to this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

Before the embodiments of this application are described in detail, a description is made on terms in the embodiments of this application, and the terms in the embodiments of this application are applicable to the following explanations.

1) Application programming interfaces (API) may be translated as application interfaces, which are some predefined functions, or agreements of connection of different components of a software system. An objective of the API is to provide a capability for an application program and a developer to access a set of routines based on specific software or hardware without accessing source code or understanding details of an internal working mechanism.

2) A software development kit (SDK) may be translated as a set of development kits used for creating application software for a specified software package, a specified software framework, a specified hardware platform, a specified operating system, and the like, and generally includes a set of related documents, examples, and tools that assist in the development of a specific type of software.

3) P frame: It is an inter predicted frame, capable of using intra prediction and inter prediction, and capable of reference prediction of a video encoding manner.

4) B frame: It is an inter predicted frame, capable of using intra prediction and inter prediction, and capable of forward, backward, and bidirectional reference prediction.

5) I frame: It is an intra predicted frame, using intra information for prediction.

6) Video codec standard is a specific agreed video bitstream decoding rule.

7) Video transcoding refers to converting a video bitstream on which compression coding has been performed to another video bitstream, to adapt to different network bandwidths, different terminal processing capabilities, and different user requirements.

8) Client is a carrier that implements specific functions in a terminal, for example, a mobile client (APP) is a carrier of specific functions in a mobile terminal, such as a function of performing online livestreaming (video streaming) or a function of playing an online video.

9) In response to: It is used for representing a condition or status on which one or more operations to be performed depend. When the condition or status is satisfied, the one or more operations may be performed immediately or after a set delay. Unless explicitly stated, there is no limitation on the order in which the plurality of operations are performed.

The following describes a use environment of a method for determining a candidate motion information list provided in this application. FIG. 1 is a schematic diagram of a use scenario of a list determining method according to an embodiment of this application. Referring to FIG. 1, terminals (including a terminal 10-1 and a terminal 10-2) are provided with corresponding clients capable of performing different functions, where the clients obtain, using different service processes from a corresponding server 200 through a network 300, different video information for browsing for the terminals (including the terminal 10-1 and the terminal 10-2). The terminal is connected to the server 200 through the network 300. The network 300 may be a wide area network, a local area network, or a combination of the wide area network and the local area network, and achieves data transmission by using a radio link.

The types of the videos obtained by the terminals (including the terminal 10-1 and the terminal 10-2) from the corresponding server 200 through the network 300 are not the same. For example, the terminals (including the terminal 10-1 and the terminal 10-2) may obtain a video from the corresponding server 200 through the network 300 (that is, the video carries video information or a corresponding video link), or may obtain different types of videos from the corresponding server 400 through the network 300 for browsing (for example, short videos or long videos). Different types of videos may be stored in the server 200 and the server 400. In some embodiments of this application, the processes of different types of videos stored in the server 200 may be written in software code of different programming languages, and code objects may be different types of code entities. For example, in software code of the C language, a code object may be a function. In software code of the JAVA language, a code object may be a class. In the OC language on the IOS side, a code object may be a piece of object code. In software code of the C++ language, a code object may be a class or a function. In this application, the compilation environments of different types of videos are no longer distinguished. However, in this process, in the related art, in the process of video compression, such as Versatile Video Coding (VVC) and Audio Video coding Standard 3 (AVS3), a video codec usually needs to construct a motion information list to derive a predicted displacement vector. However, when the motion information list does not have sufficient displacement vectors, the motion information list cannot provide an effective predicted displacement vector. For example, during displacement vector prediction, only an intra prediction historical motion information IntraHMVP table is constructed to construct a candidate motion information list, and a block vector predictor (BVP) or a string vector predictor (SVP) is derived. The maximum length of the IntraHMVP is 12, and the maximum length of the candidate motion information list is 7. When the length of the IntraHMVP is insufficient or empty, the candidate motion information list cannot be filled, resulting in insufficient motion information for the displacement vector prediction. As a result, the video compression performance is affected, and the video compression rate is reduced, which is not conducive to the user experience of video compression.

In some embodiments, when the server 200 sends or receives different types of videos to the terminal (the terminal 10-1 and/or the terminal 10-2) through the network 300, since the video information occupies a large storage space, the video information needs to be compressed. In an example, the server 200 is configured to determine a target motion information list and a historical motion information table, the historical motion information table being used for at least one of inter prediction, intra prediction, intra block copy prediction, or intra string copy prediction, and further determine a quantity of displacement vectors in the historical motion information table; and obtain, when the target motion information list is not full, at least one piece of motion information based on the historical motion information table, and fill the candidate motion information list based on the at least one piece of motion information, the candidate motion information list being used for providing candidate predicted displacement vectors for a current codec block.

Certainly, in some embodiments of this application, the server 200 may be further configured to determine a position relationship between a historical motion information table and a spatial domain motion information list; and obtain, when a target motion information list is not full, at least one piece of motion information based on at least one of the historical motion information table or the spatial domain motion information list, and fill the candidate motion information list based on the at least one piece of motion information, the candidate motion information list being used for providing candidate predicted displacement vectors for a current codec block. For example, during video compression, the server 200 may flexibly adjust the process of determining the candidate motion information list according to different use environments or user settings. For example, a candidate motion information list may be flexibly filled using an intra prediction historical motion information table, or a candidate motion information list in an inter prediction, intra block copy prediction, or intra string copy prediction process may be filled using other types of historical motion information tables.

In practical applications, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

Figure 2:
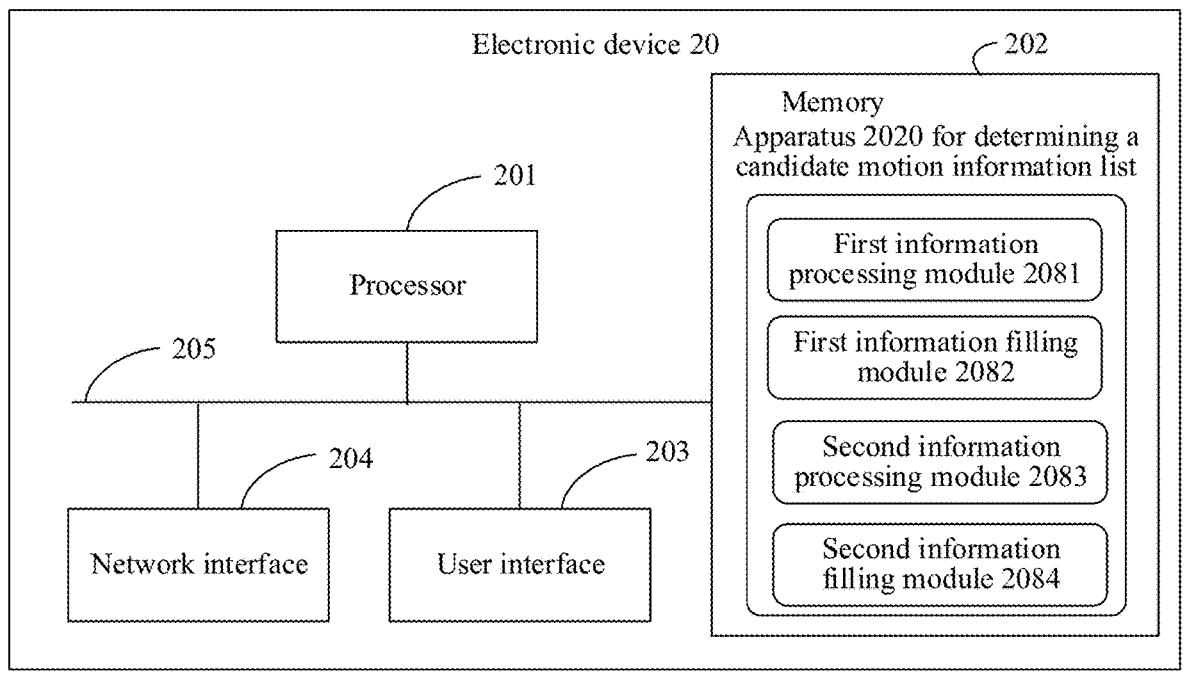
FIG. 2 is a schematic structural diagram of composition of an electronic device according to an embodiment of this application.

The following describes a structure of the server according to the embodiments of this application in detail. The server may be implemented in various forms, for example, a dedicated terminal with a function of determining a candidate motion information list such as a gateway, or a server with the function of determining a candidate motion information list such as the foregoing server 200 in FIG. 1. FIG. 2 is a schematic structural diagram of composition of an electronic device according to an embodiment of this application. It may be understood that, FIG. 2 shows only an exemplary structure rather than a complete structure of the server. The structure shown in FIG. 2 may be partially or entirely implemented based on requirements.

The server provided in this embodiment of this application includes: at least one processor 201, a memory 202, a user interface 203, and at least one network interface 204. The components in the electronic device are coupled by using a bus system 205. It may be understood that the bus system 205 is configured to implement connection and communication between these assemblies. In addition to a data bus, the bus system 205 further includes a power bus, a control bus, and a state signal bus. However, for ease of clear description, all types of buses are labeled as the bus system 205 in FIG. 2.

The user interface 203 may include a display, a keyboard, a mouse, a track ball, a click wheel, a key, a button, a touch panel, a touchscreen, or the like.

It may be understood that, the memory 202 may be a volatile memory or a non-volatile memory, or may include both a volatile memory and a non-volatile memory. The memory 202 in this embodiment of this application can store data to support operation of the terminal (for example, 10-1). Examples of these types of data include any computer program to be operated on the terminal (for example, 10-1), for example, an operating system and an application program. The operating system includes various system programs, such as framework layers, kernel library layers, and driver layers used for implementing various basic services and processing hardware-based tasks. The application program may include various application programs.

In some embodiments, an apparatus for determining a candidate motion information list provided in the embodiments of this application may be implemented by a combination of software and hardware. For example, the apparatus for determining a candidate motion information list provided in the embodiments of this application may be a processor in the form of a hardware decoding processor, and is programmed to perform the method for determining a candidate motion information list provided in the embodiments of this application. For example, the processor in the form of a hardware decoding processor may use one or more application-specific integrated circuits (ASIC), a DSP, a programmable logic device (PLD), a complex PLD (CPLD), a field programmable gate array (FPGA), or another electronic element.

For example, the apparatus for determining a candidate motion information list provided in this embodiment of this application is implemented by a combination of software and hardware. The apparatus for determining a candidate motion information list provided in this embodiment of this application may be directly embodied as a combination of software modules executed by the processor 201. The software module may be located in a storage medium, the storage medium is located in the memory 202, and the processor 201 reads executable instructions included in the software module in the memory 202, and implements, in combination with necessary hardware (for example, including a processor 201 and another component connected to the bus 205), the method for determining a candidate motion information list provided in the embodiments of this application.

For example, the processor 201 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

In an example in which the apparatus for determining a candidate motion information list provided in the embodiments of this application is implemented by hardware, the apparatus provided in the embodiments of this application may be directly executed by using the processor 201 in the form of a hardware decoding processor, for example, one or more ASICs, DSPs, PLDs, CPLDs, FPGAs, or other electronic elements, to execute the method for determining a candidate motion information list provided in the embodiments of this application.

The memory 202 in this embodiment of this application is configured to store various types of data to support operations of the electronic device. An example of the data includes: any executable instruction configured to be operated on the electronic device, such as an executable instruction, and a program that implements the method for determining a candidate motion information list of the embodiments of this application may be included in the executable instruction.

In some other embodiments, the apparatus for determining a candidate motion information list provided in the embodiments of this application may be implemented by software. FIG. 2 shows an apparatus 2020 for determining a candidate motion information list stored in the memory 202, which may be software in the form of a program and a plug-in and includes a series of modules. An example of a program stored in the memory 202 may include the apparatus 2020 for determining a candidate motion information list. The apparatus 2020 for determining a candidate motion information list includes the following software modules: a first information processing module 2081, a first information filling module 2082, a second information processing module 2083, and a second information filling module 2084. When the software modules in the apparatus 2020 for determining a candidate motion information list are read into a random access memory (RAM) and executed by the processor 201, the method for determining a candidate motion information list provided in the embodiments of this application is implemented. The functions of each software module in the apparatus 2020 for determining a candidate motion information list are described below:

The first information processing module 2081 is configured to determine a target motion information list and a historical motion information table for a current codec block.

The first information filling module 2082 is configured to obtain, when the target motion information list is not full, at least one piece of motion information based on the historical motion information table, the first information filling module 2082 being configured to fill the candidate motion information list based on the at least one piece of motion information.

The second information processing module 2083 is configured to determine a position relationship between a historical motion information table and a spatial domain motion information list for a current codec block.

The second information filling module 2084 is configured to obtain, when a target motion information list is not full, at least one piece of motion information based on at least one of the historical motion information table or the spatial domain motion information list, and fill the candidate motion information list based on the at least one piece of motion information, the candidate motion information list being used for providing candidate predicted displacement vectors for a current codec block.

According to the electronic device shown in FIG. 2, in an aspect of this application, a computer program product or a computer program is further provided in this application, the computer program product or the computer program including computer instructions, the computer instructions being stored in a computer-readable storage medium. A processor of a computer device reads the computer instructions from the computer-readable storage medium, and executes the computer instructions, so that the computer device performs the different embodiments and combinations of the embodiments provided in the various implementations of the method for determining a candidate motion information list.

Figure 3:
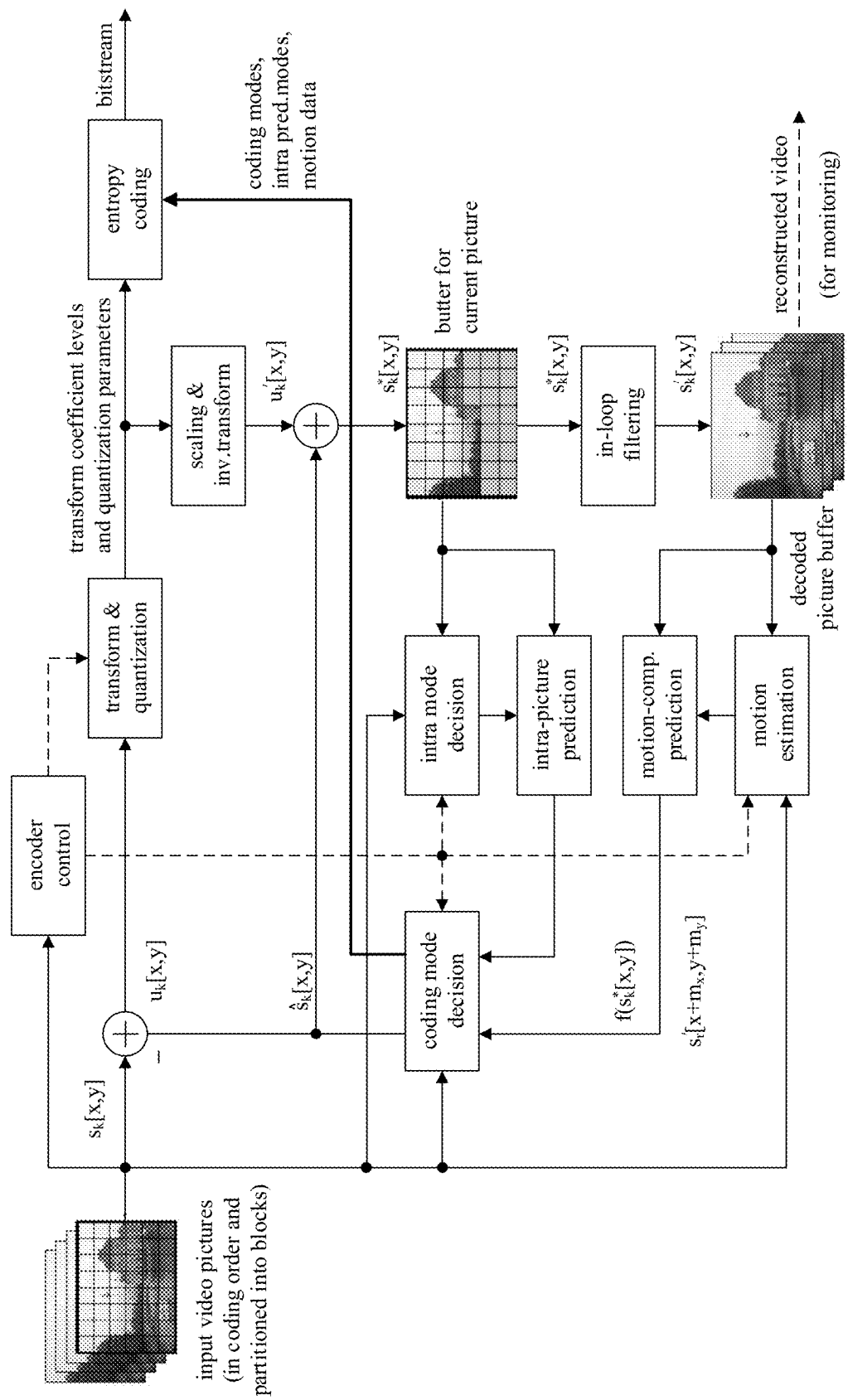
FIG. 3 is a schematic flowchart of a video encoding process according to an embodiment of this application.

Before the method for determining a candidate motion information list provided in this application is described, a video encoding process in the related art is first introduced. FIG. 3 is a schematic flowchart of a video encoding process according to an embodiment of this application. A video signal refers to a sequence of images including a plurality of frames. A frame is a representation of spatial information of a video signal. Taking the YUV mode as an example, a frame includes a luma sample matrix (Y) and two chroma sample matrices (Cb and Cr). Video signals may be obtained in two manners: camera capturing and computer generation. Due to different statistical characteristics, the corresponding compression coding methods may also be different.

In the related video coding technologies, such as High Efficient Video Coding (H.265/HEVC), Versatile Video Coding (H.266/VVC) standard, and Audio Video coding Standard (AVS) (for example, AVS3), a hybrid coding framework is used to perform the following series of operations and processing on an inputted original video signal:

1. Block partition structure: The input image is divided into several non-overlapping processing units, and each processing unit perform similar compression operations. This processing unit is referred to as a coding tree unit (CTU), or a largest coding unit (LCU). Further down the CTU, finer division may be performed to obtain one or more basic coding units, which are referred to as coding units (CUs). Each CU is the most basic element in a coding session. Described below are various encoding methods that may be used for each CU.

2. Predictive coding: It includes manners such as intra prediction and inter prediction. After the original video signal is predicted by the selected reconstructed video signal, a residual video signal is obtained. The encoder needs to select the most suitable mode among many possible predictive coding modes for the current CU, and inform the decoder. The intra prediction means that the predicted signal comes from an area that has been coded and reconstructed in the same image. The inter prediction means that the predicted signal comes from an already coded image (referred to as a reference image) that is different from the current image.

3. Transform & Quantization: The residual video signal undergoes transformation operations such as discrete fourier transform (DFT) and discrete cosine transform (DCT), to convert the signal to a transform domain, which is referred to as a transform coefficient. A signal in the transform domain is subjected to a lossy quantization operation, which loses specific information, so that the quantized signal is beneficial to compression expression. In some video coding standards, there may be more than one transformation mode to choose from. Therefore, the encoder further needs to select one of the transformations for the current CU and inform the decoder. The fineness of quantization is usually determined by a quantization parameter (QP). If the value of the QP is larger, the coefficients representing a larger value range are quantized into the same output, which usually brings larger distortion and lower code rate. On the contrary, if the value of the QP is smaller, the coefficients representing a smaller value range are quantized into the same output, which usually brings less distortion and corresponds to a higher code rate.

4. Entropy coding or statistical coding: The quantized transform domain signal undergoes statistical compression coding according to the frequency of occurrence of each value, to finally output a binarized (0 or 1) compressed bitstream. In addition, the encoding generates other information, such as the selected mode, a motion vector, and entropy encoding is also required to reduce the bit rate. Statistical coding is a lossless coding method that can effectively reduce the code rate required to express the same signal. Common statistical coding methods include variable length coding (VLC) or context adaptive binary arithmetic coding (CABAC).

5. Loop filtering: A decoded image is subject to inverse quantization, inverse transformation, and prediction compensation operations (reverse operations of the foregoing 2-4), so that a reconstructed decoded image can be obtained. Compared with the original image, the reconstructed image has some information different from the original image due to the effect of quantization, resulting in distortion. Filtering the reconstructed image such as deblocking by using filters such as a sample adaptive offset (SAO) or adaptive lattice filter (ALF) can effectively reduce the amount of distortion produced by quantization. Since the filtered reconstructed images are used as reference for subsequent encoded images to predict future signals, the foregoing filtering operations are also referred to as loop filtering and filtering operations within the encoding loop.

As can be seen according to the foregoing encoding process, at the decoder, for each CU, after obtaining the compressed bitstream, the decoder first performs entropy decoding to obtain various mode information and quantized transform coefficients. Each coefficient is inversely quantized and inversely transformed to obtain a residual signal. On the other hand, according to the known coding mode information, the prediction signal corresponding to the CU may be obtained. After the two signals are added, a reconstructed signal may be obtained. Finally, a reconstructed value of the decoded image needs to undergo a loop filtering operation to generate the final output signal.

In the related video coding standards, such as HEVC, VVC, and AVS3, a block-based hybrid coding framework is adopted, where original video data is divided into a series of coding blocks. By using video coding methods such as prediction, transform, and entropy coding, the compression of video data is implemented. Motion compensation is a type of prediction method commonly used in video coding. Based on the redundancy characteristics of video content in the temporal or spatial domain, motion compensation is to derive the predicted value of the current coding block from the coded region. Such prediction methods include: inter prediction, intra block copy prediction, intra string copy prediction, and the like, which may be used alone or in combination in coding implementations. For coding blocks using these prediction methods, one or more two-dimensional displacement vectors need to be explicitly or implicitly coded in the bitstream, indicating displacement of the current block (or a co-located block of the current block) relative to one or more reference blocks thereof.

In different prediction modes and different implementations, a displacement vector may have different names, which is uniformly described in the following manner: 1) a displacement vector in the inter prediction mode is referred to as a motion vector (MV); 2) a displacement vector in the IBC prediction mode is referred to as a block vector (BV); and 3) a displacement vector in the ISC prediction mode is referred to as a string vector (SV). Intra string copy is also referred to as "string prediction", "string matching", and the like.

The MV refers to a displacement vector used in the inter prediction mode, pointing from the current image to the reference image, and has a value being a coordinate offset between the current block and the reference block, where the current block and the reference block are in two different images. In the inter prediction mode, motion vector prediction may be introduced. The motion vector of the current block is predicted, so that the predicted motion vector corresponding to the current block is obtained. A difference between the predicted motion vector corresponding to the current block and the actual motion vector is encoded and transmitted, which is beneficial to reduce the bit overhead compared to directly encoding and transmitting the actual motion vector corresponding to the current block. In this embodiment of this application, the predicted motion vector refers to a predicted value of the motion vector of the current block obtained through the motion vector prediction technology.

The BV refers to a displacement vector used in the IBC prediction mode, and has a value being a coordinate offset between the current block and the reference block, where both the current block and the reference block are in the current image. In the IBC prediction mode, block vector prediction may be introduced. The block vector of the current block is predicted, so that the predicted block vector corresponding to the current block is obtained. A difference between the predicted block vector corresponding to the current block and the actual block vector is encoded and transmitted, which is beneficial to reduce the bit overhead compared to directly encoding and transmitting the actual block vector corresponding to the current block. In this embodiment of this application, the predicted block vector refers to a predicted value of the block vector of the current block obtained through the block vector prediction technology.

The SV refers to a displacement vector used in the ISC prediction mode, and has a value being a coordinate offset between the current string and the reference string, where both the current string and the reference string are in the current image. In the ISC prediction mode, string vector prediction may be introduced. The string vector of the current string is predicted, so that the predicted string vector corresponding to the current string is obtained. A difference between the predicted string vector corresponding to the current string and the actual string vector is encoded and transmitted, which is beneficial to reduce the bit overhead compared to directly encoding and transmitting the actual string vector corresponding to the current string. In this embodiment of this application, the predicted string vector refers to a predicted value of the string vector of the current string obtained through the string vector prediction technology.

Figure 4:
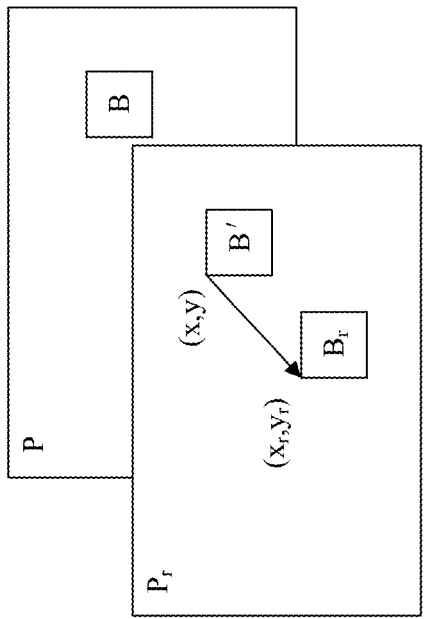
FIG. 4 is a schematic diagram of an inter prediction mode according to an embodiment of this application.

Several different prediction modes are described below:
1. Inter Prediction Mode FIG. 4 is a schematic diagram of an inter prediction mode according to an embodiment of this application. The inter prediction is to predict a pixel of the current image by using correlation of time domain of the video and using a pixel of a neighboring encoded image, so that the time domain of the video is not redundant, and bits of encoded residual data can be effectively reduced. P is a current frame, Pr is a reference frame, B is a current to-be-encoded block, and Br is a reference block of B. The coordinates of B' and B in the image are the same, the coordinates of Br are (xr, yr), and the coordinates of B' are (x, y). The displacement between the current to-be-encoded block and the reference block is referred to as a motion vector (MV), that is:

$$MV=(xr-x, yr-y).$$

Considering the strong correlation between neighboring blocks in temporal or spatial domains, MV prediction technologies can be used to reduce the bits required to encode MVs. In H.265/HEVC, inter prediction includes two MV prediction technologies of Merge and advanced motion vector prediction (AMVP).

The Merge mode builds a MV candidate list for the current prediction unit (PU), in which there are five candidate MVs (and corresponding reference images). The five candidate MVs are traversed, to select one with the smallest rate-distortion cost as the optimal MV. If the codec builds a candidate list in the same manner, the encoder only needs to transmit an index of the optimal MV in the candidate list.

The MV prediction technology of HEVC also has a skip mode, which is a special case of the Merge mode. After the optimal MV is found in the Merge mode, if the current block is basically the same as the reference block, there is no need to transmit residual data, only the index of the MV and a skip flag need to be transmitted.

Figure 5:
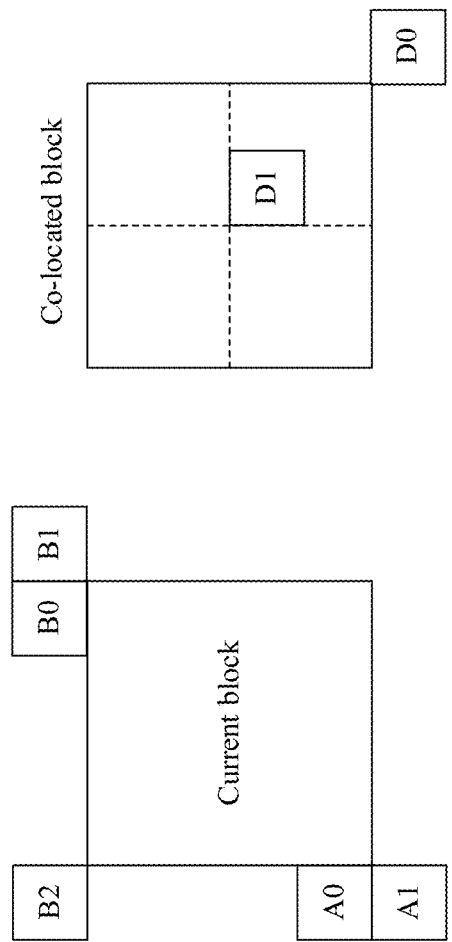
FIG. 5 is a schematic diagram of candidate motion vectors according to an embodiment of this application.

FIG. 5 is a schematic diagram of candidate motion vectors according to an embodiment of this application. The MV candidate list established in the Merge mode includes both the spatial domain and the time domain. B Slice (B frame image) further includes the manner of combining the list. The spatial domain provides up to four candidate MVs, whose establishment is shown in part (a) of FIG. 5. The spatial domain list is established in the order of A1→B1→B0→A0→B2, where B2 is a substitute, that is, when one or more of A1, B1, B0, and A0 do not exist, the motion information of B2 needs to be used. The time domain provides only one candidate MV at most, whose establishment is shown in part (b) of FIG. 5, and is obtained by scaling the MV of the co-located PU as follows:

$$curMV=td*colMV/tb, \text{ where}$$

curMV represents the MV of the current PU, colMV represents the MV of the co-located PU, td represents a distance between the current image and the reference image, and tb represents a distance between the co-located image and the reference image. If the PU at the D0 position on the co-located block is unavailable, the co-located PU at the D1 position is used for replacement. For a PU in the B slice, since there are two MVs, the MV candidate list also needs to provide two motion vector predictors (MVPs). HEVC generates a combined list for the B slice by combining the first four candidate MVs in the MV candidate list in pairs.

Similarly, the AMVP mode utilizes the MV correlation of neighboring blocks in the spatial and temporal domains to build an MV candidate list for the current PU. Different from the Merge mode, the optimal predicted MV is selected in the MV candidate list of the AMVP mode, and differential coding is performed on the optimal MV obtained by motion search of the current to-be-encoded block, that is, coded MVD=MV-MVP, where MVD is a motion vector difference. By establishing the same list, the decoder only needs the sequence numbers of the MVD and MVP in the list to calculate the MV of the current decoded block. The MV candidate list of the AMVP mode also includes two cases of the spatial domain and the time domain, and the difference is that the length of the MV candidate list of the AMVP mode is only 2.

History based motion vector prediction (HMVP) is a new MV prediction technology adopted in H.266/VVC. The HMVP is a motion vector prediction method based on historical information. The motion information of the historical coding blocks is stored in the HMVP list and used as the MVP of the current CU. In H.266/VVC, the HMVP is added to the candidate list of the Merge mode, whose sequence is after the spatial and temporal MVPs. In the HMVP technology, the motion information of previously encoded blocks is stored in first input first output (FIFO). If the stored candidate motion information is the same as the motion information just coded, the duplicate candidate motion information is removed first, all HMVP candidates are moved forward, and the motion information of the current coding unit is added at the end of the FIFO. If the motion information of the current coding unit is different from any candidate motion information in the FIFO, the latest motion information is added to the end of the FIFO. When new motion information is added to the HMVP list, if the list has reached the maximum length, the first candidate in the FIFO is removed, and the latest motion information is added to the end of the FIFO. The HMVP list is reset (emptied) when a new coding tree unit (CTU) row is encountered. In H.266/VVC, the HMVP table size S is set to 6. To reduce the quantity of redundant determination operations, the following simplifications are introduced:

1. Set the quantity of HMVP candidates for Merge list generation as (N<=4)?M: (8-N), where N represents the quantity of existing candidates in the Merge list and M represents the quantity of available HMVP candidates in the Merge list.

2. Once the length of the available Merge list reaches the maximum allowed length minus 1, the merge candidate list construction process of the HMVP terminates.

2. IBC Prediction Mode

Figure 6:
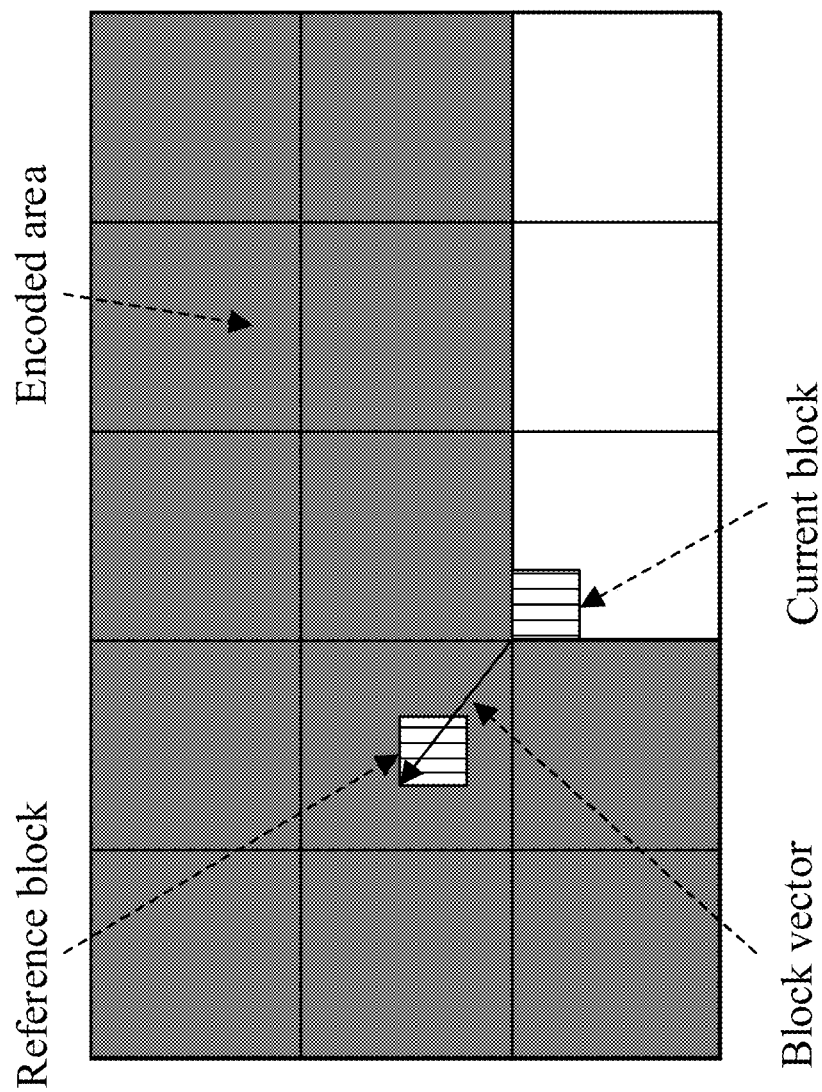
FIG. 6 is a schematic diagram of an intra block copy mode according to an embodiment of this application.

IBC is an intra coding tool adopted in the HEVC screen content coding (SCC) extension, which significantly improves the coding efficiency of screen content. In AVS3 and VVC, the IBC technology is also adopted to improve the performance of screen content coding. IBC utilizes the spatial correlation of screen content and video, and uses the encoded image pixels on the current image to predict the pixels of the current to-be-encoded block, which can effectively reduce the bits required for encoding pixels. As shown in FIG. 6, the displacement between the current block and the reference block in IBC is referred to as a BV. H.266/VVC uses a BV prediction technology similar to inter prediction to reduce the bits required for encoding the BV.

2. ISC Prediction Mode

Figure 7:
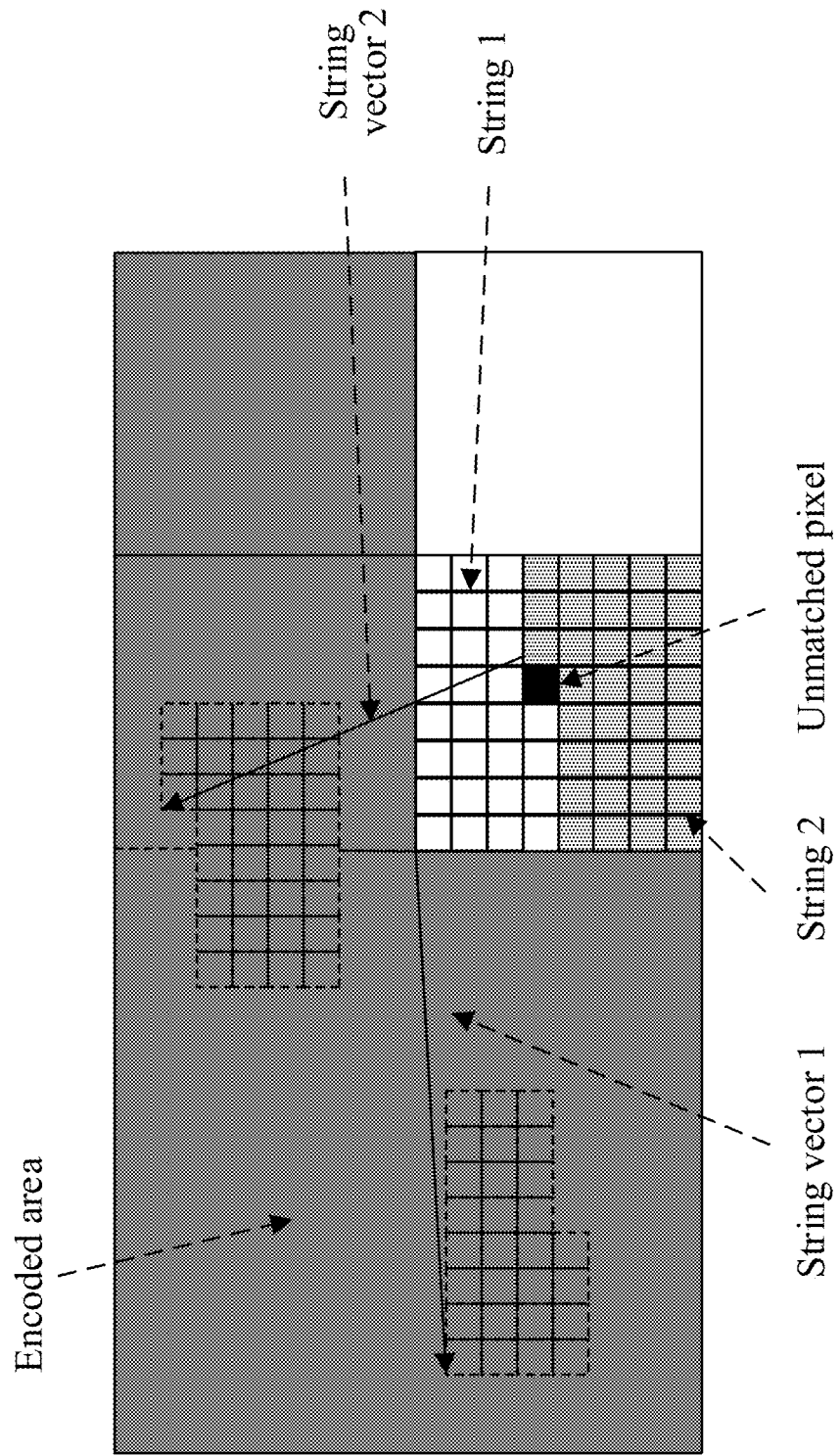
FIG. 7 is a schematic diagram of an intra string copy mode according to an embodiment of this application.

The ISC technology is to divide an encoded block into a series of pixel strings or unmatched pixels according to a specific scanning sequence (for example, raster scan, round-trip scan, and Zig-Zag scan). Similar to IBC, each string searches for a reference string of the same shape in the encoded area of the current image, and derives a predicted value of the current string. A residual between the pixel value of the current string and the predicted value is encoded instead of directly encoding the pixel value, which can effectively reduce bits. FIG. 7 is a schematic diagram of intra string copy. The dark gray area is an encoded area, the 28 white pixels are string 1, the 35 light gray pixels are string 2, and the one black pixel represents an unmatched pixel. The displacement between string 1 and a reference string thereof is the string vector 1 in FIG. 6; and the displacement between string 2 and a reference string thereof is the string vector 2 in FIG. 6.

The intra string copy technology needs to encode the SV corresponding to each string in the current coding block, the string length, and the flag of whether there is a matching string. The SV represents the displacement of the to-be-encoded string to the reference string thereof. The string length indicates a quantity of pixels included in the string. In different implementations, there are many manners of encoding the string length. Several examples are given below (some examples may be used in combination): 1) Encode the length of the string directly in the bitstream; 2) Encode a quantity of pixels to be processed of the string in the bitstream, where the decoder calculates the length of the current string L=N−N1−N2 according to the size N of the current block, the quantity of processed pixels N1, and the quantity of pixels to be processed N2 obtained by decoding; and 3) Encode a flag in the bitstream to indicate whether the string is the last string. If the string is the last string, the length of the current string L=N−N1 is calculated according to the size N of the current block and the quantity of processed pixels N1. If a pixel does not find a corresponding reference in the referenced area, the pixel value of the unmatched pixel is encoded directly.

4. Intra Prediction Motion Vector Prediction in AVS3

IBC and ISC are two screen content coding tools in AVS3, which both use the current image as a reference and derive the predicted value of the coding unit through motion compensation. Considering that IBC and ISC have similar reference regions, BV and SV have a high correlation, which can improve the coding efficiency by allowing prediction between the two. AVS3 uses an intra prediction historical motion information table (IntraHMVP) similar to HMVP to record the displacement vector information, position information, size information, and repetition times of the two types of coding blocks, and IntraHMVP derives a block vector predictor (BVP) and a string vector predictor (SVP). BVP is the predicted value of the block vector, and SVP is the predicted value of the string vector. To support parallel coding, if the current largest coding unit is the first largest coding unit of the current row in the slice, the value of CntIntraHmvp in the intra prediction historical motion information table is initialized to 0.

1. Derivation of Block Vector Predictor

Class based block vector prediction (CBVP) is adopted in AVS3. Similar to HMVP, this method first uses a history based block vector prediction (HBVP) list to store information about historical IBC coding blocks. In addition to recording the BV information of the historical coding blocks, information such as the positions and sizes of the historical coding blocks is also recorded. For the current coding block, the candidate BVs in HBVP are classified according to the following conditions:

Category 0: The area of the historical coding block is greater than or equal to 64 pixels.

Category 1: The frequency of BV is greater than or equal to 2.

Category 2: The coordinates of the upper left corner of the historical coding block are located to the left of the coordinates of the upper left corner of the current block.

Category 3: The coordinates of the upper left corner of the historical coding block are located above the coordinates of the upper left corner of the current block.

Category 4: The coordinates of the upper left corner of the historical coding block are located at the upper left of the coordinates of the upper left corner of the current block.

Category 5: The coordinates of the upper left corner of the historical coding block are located at the upper right of the coordinates of the upper left corner of the current block.

Category 6: The coordinates of the upper left corner of the historical coding block are located at the lower left of the coordinates of the upper left corner of the current block.

The instances in each category are arranged in the reverse order of the coding order (the closer the coding order is to the current block, the higher the ordering is), and the BV corresponding to the first historical coding block is the candidate BV corresponding to the category. The candidate BV corresponding to each category is then added to CBVP list in the order of category 0 to category 6. When a new BV is added to the CBVP list, it is necessary to determine whether a duplicate BV already exists in the CBVP list. A BV is added to the CBVP list only if there is no duplicate BV. The encoder selects the optimal candidate BV in the CBVP list as the BVP, and encodes an index in the bitstream, indicating the index of the category corresponding to the optimal candidate BV in the CBVP list. The decoder decodes the BVP from the CBVP list according to the index.

After the decoding of the current prediction unit is completed, if the prediction type of the current prediction unit is block copy intra prediction (that is, IBC), when NumOfIntraHmvpCand is greater than 0, the IntraHMVP is updated according to the block copy intra prediction motion information of the current predicted block in the following manner. The intra prediction motion information of the current predicted block includes displacement vector information, position information, size information, and repetition times, where the displacement vector information of the block copy intra predicted block is a block vector; the position information includes the abscissa of the upper left corner and the ordinate of the upper left corner of the current predicted block; the size information is the product of width and height; and the repetition times of the current predicted block is initialized to 0.

2. Derivation of Sting Vector Predictor

AVS3 encodes an index for each string in the ISC coding block, indicating a position of a SVP of the string in IntraHMVP. Similar to the skip mode in inter prediction, the SV of the current string is equal to the SVP, and there is no need to encode the residual between the SV and the SVP.

After the decoding of the current prediction unit is completed, if the prediction type of the current prediction unit is string copy intra prediction (that is, ISC), when NumOfIntraHmvpCand is greater than 0, the IntraHMVP is updated according to the string copy intra prediction motion information of the current predicted block in the following manner. The string copy intra prediction motion information of the current predicted block includes displacement vector information, position information, size information, and repetition times, where the displacement vector information of the current string is a string vector; the position information includes the abscissa and the ordinate of the first pixel sample of the string, that is, (xi, yi); the size information is the string length of this part, that is, StrLen[i]; and the repetition times is initialized to 0.

3. Intra Prediction Historical Motion Information Table Update

The intra prediction motion information includes displacement vector information, position information, size information, and repetition times. After the current prediction unit is decoded, if the prediction type of the current prediction unit is block copy intra prediction or string copy intra prediction, and NumOfIntraHmvpCand is greater than 0, according to the intra prediction motion information of the current predicted block, the displacement vector information, the position information, the size information, and the repetition times of the intra prediction historical motion information table IntraHmvpCandidateList[X] are updated and recorded as intraMvCandX, posCandX, sizeCandX, and cntCandX respectively; otherwise, the operations defined in this clause are not performed.

a) Initialize X to 0 and cntCur to 0.

b) If CntIntraHmvp is equal to 0, IntraHmvpCandidateList[CntIntraHmvp] is the intra prediction motion information of the current prediction unit, and CntIntraHmvp is incremented by 1.

c) Otherwise, determine whether the intra prediction motion information of the current predicted block is the same as IntraHmvpCandidateList[X] according to whether intraMvCur and intraMvCandX are equal:

1) If intraMvCur and intraMvCandX are the same, perform step d); otherwise, add 1 to X.

2) If X is less than CntIntraHmvp, perform step c); otherwise, perform step e).

d) cntCur is equal to the value of cntCandX plus 1. If sizeCur is less than sizeCandX, the current sizeCur is equal to sizeCandX respectively.

e) If X is less than CntIntraHmvp:

1) i from X to CntIntraHmvp−1, and cause IntraHmvpCandidateList[i] to be equal to IntraHmvpCandidateList[i+1];

2) IntraHmvpCandidateList[CntIntraHmvp−1] is equal to the intra prediction motion information of the current prediction unit.

f) Otherwise, if X is equal to CntIntraHmvp and CntIntraHmvp is equal to NumOfIntraHmvpCand:

1) i from 0 to CntIntraHmvp−1, and cause IntraHmvpCandidateList[i] to be equal to IntraHmvpCandidateList[i+1]; and 2) IntraHmvpCandidateList[CntIntraHmvp−1] is equal to the intra prediction motion information of the current prediction unit.

g) Otherwise, if X is equal to CntIntraHmvp and CntIntraHmvp is less than NumOfIntraHmvpCand, IntraHmvpCandidateList[CntIntraHmvp] is equal to the intra prediction motion information of the current prediction unit, and CntIntraHmvp is incremented by 1.

In the current AVS3 standard, during displacement vector prediction, a candidate motion information list is constructed and a block vector predictor (BVP) or a string vector predictor (SVP) is derived only by constructing an intra prediction historical motion information (IntraHMVP) table. The maximum length of the IntraHMVP is 12, and the maximum length of the candidate motion information list is 7. When the length of the IntraHMVP is insufficient or empty, the candidate motion information list cannot be filled, resulting in insufficient motion information for the displacement vector prediction.

Figure 8:
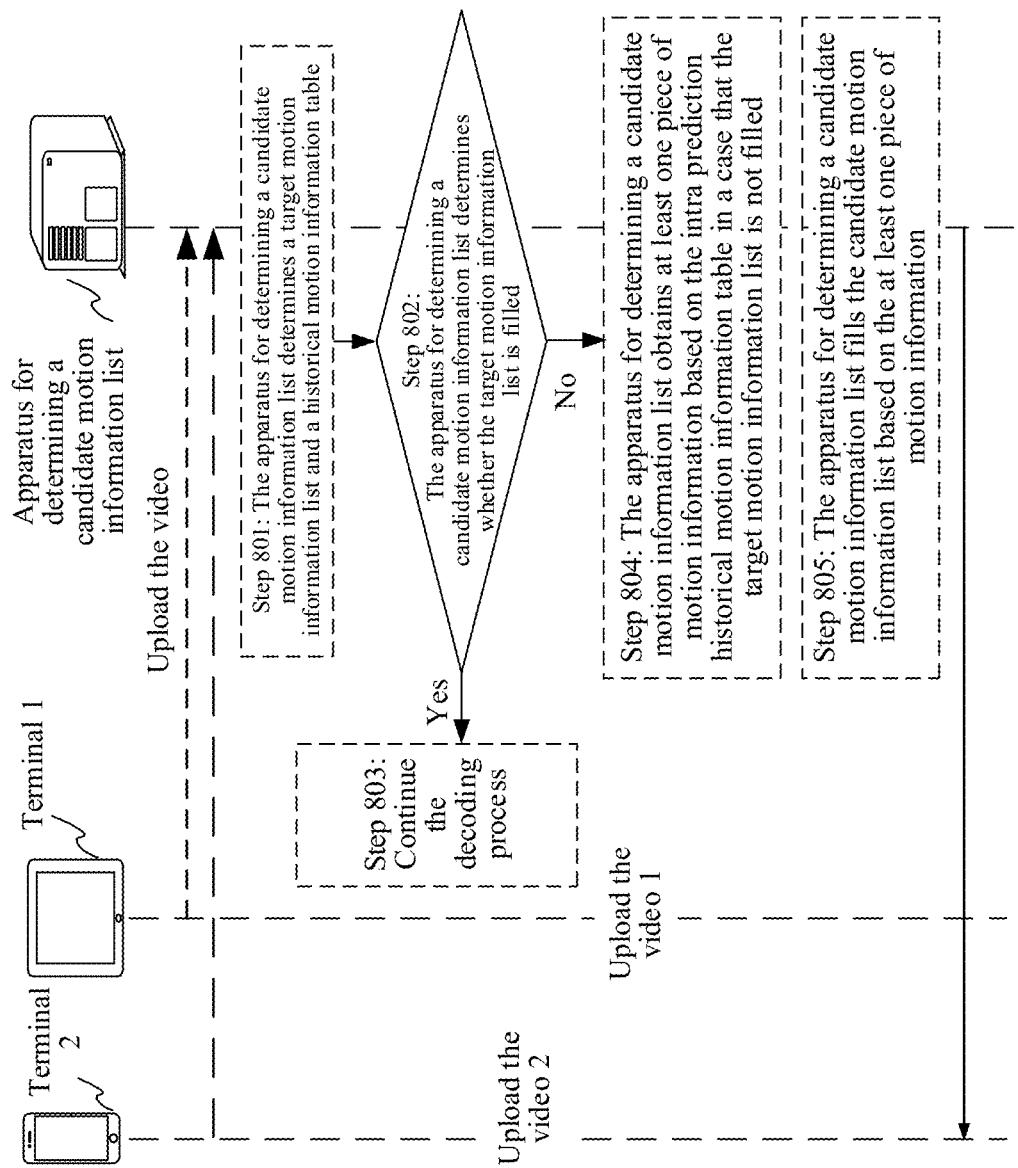
FIG. 8 is a schematic flowchart of a method for determining a candidate motion information list according to an embodiment of this application.

To overcome the foregoing defects, referring to FIG. 8, through the method for determining a candidate motion information list provided in this application, a corresponding candidate motion information list can be determined based on the spatial domain, to improve the video compression performance in combination with a historical motion information list, thereby effectively improving the user experience of video compression.

The method for determining a candidate motion information list provided in the embodiments of this application is described with reference to the foregoing embodiments. FIG. 8 is an exemplary schematic flowchart of a method for determining a candidate motion information list for a current codec block according to an embodiment of this application. It may be understood that, steps shown in FIG. 8 may be performed by various servers running the apparatus for determining a candidate motion information list, such as a dedicated terminal, a server, or a server cluster with a function of determining a candidate motion information list. The following describes the steps shown in FIG. 8.

Step 801: The apparatus for determining a candidate motion information list determines a target motion information list and a historical motion information table for a current codec block.

The historical motion information table is used for at least one of inter prediction, intra prediction, intra block copy prediction, or intra string copy prediction for the current codec block.

The method for determining a candidate motion information list provided in the embodiments of this application may be applied to the three-dimensional video coding technologies, such as High Efficiency Video Coding (HEVC). The three-dimensional coding technology uses neighboring reconstructed pixels to perform intra prediction on the current block, and selects a predicted motion vector from the motion vectors of the neighboring blocks to construct a motion vector list for inter prediction of motion compensation. In the three-dimensional coding technology, three concepts of coding unit (CU), prediction unit (PU), and transform unit TU) are used to describe the entire coding process. The CU is a macroblock or a sub-macroblock, and each CU is a 2N*2N pixel block (N is a power of 2). Each CU implements the prediction process through a PU. The size of the PU is limited by the CU, which may be a square (for example, 2N*2N, N*N) or a rectangle (2N*N, N*2N). In some embodiments of this application, as shown in the subsequent FIG. 11, the size of the A, B, C, D, and E blocks is the minimum block size (4*4) defined by the system. Certainly, in actual use, the size may be adjusted flexibly according to the use environment of the method for determining a candidate motion information list.

Step 802: The apparatus for determining a candidate motion information list determines whether the target motion information list is filled, and if yes, perform step 803; otherwise, perform step 804.

Step 803: Continue the decoding process.

Step 804: The apparatus for determining a candidate motion information list obtains at least one piece of motion information based on the historical motion information table when the target motion information list is not filled.

That the target motion information list is not full includes:
the target motion information list is not full after filling based on a spatial domain motion information list; or the target motion information list is not full without filling based on the spatial domain motion information list.

In some embodiments, the candidate motion information list is filled in at least one of the following manners when the target motion information list is not full:
filling the candidate motion information list based on the historical motion information table; or filling the candidate motion information list based on the spatial domain motion information list; or filling the candidate motion information list based on the historical motion information table and the spatial domain motion information list. By using different filling processes individually or in combination, different video compression use environments can be adapted, and the adaptability of the method for determining a candidate motion information list provided in this application can be improved. The process of determining the candidate motion information list by using the historical motion information table, the process of determining the candidate motion information list by using the spatial domain motion information list, and the process of jointly determining the candidate motion information list by using the spatial domain motion information list and the historical motion information table are described in subsequent embodiments respectively.

Step 805: The apparatus for determining a candidate motion information list fills the candidate motion information list based on the at least one piece of motion information.

The candidate motion information list is used for providing candidate predicted displacement vectors for a current codec block.

In some embodiments of this application, the obtaining at least one piece of motion information based on the historical motion information table, and filling the candidate motion information list based on the at least one piece of motion information includes:
determining the corresponding displacement vectors based on the historical motion information table, and filling the candidate motion information list based on the displacement vectors; determining the corresponding displacement vectors based on the historical motion information table, and performing dynamic filling based on the parity of the index of the filling position in the candidate motion information list; or determining the corresponding displacement vectors based on the historical motion information table, and filling a displacement vector in a prediction mode based on the displacement vectors, to implement filling of the candidate motion information list; or determining the corresponding displacement vectors based on the historical motion information table, and performing dynamic filling based on a quantity of the displacement vectors and the index of the filling position in the candidate motion information list. The filling the candidate motion information list based on the displacement vectors may be performed according to any one of the following 1) to 3) manners:

Manner 1): Determine a first displacement vector and a last displacement vector in the historical motion information table based on the historical motion information table, and fill the candidate motion information list based on an average of the first displacement vector and the last displacement vector. Manner 2): Determine the first displacement vector and the last displacement vector in the historical motion information table based on the historical motion information table, and fill the candidate motion information list based on a weighted average of the first displacement vector and the last displacement vector. Manner 3): Determine the first displacement vector in the historical motion information table based on the historical motion information table, and fill the candidate motion information list based on the first displacement vector.

In some embodiments of this application, due to different parity of indexes of filling positions in the candidate motion information list, dynamic filling may be performed based on the parity of the indexes of the filling positions in the candidate motion information list. For example, the candidate motion information list may be filled in the following manners: determining, when the index of the filling position in the candidate motion information list is an odd number, a first displacement vector and a last displacement vector in the historical motion information table, and filling the candidate motion information list based on an average of the first displacement vector and the last displacement vector; or determining the first displacement vector in the historical motion information table based on the historical motion information table, and filling the candidate motion information list based on the first displacement vector. In another aspect, the candidate motion information list may be filled in the following manners: determining, when the index of the filling position in the candidate motion information list is an even number, a first displacement vector and a last displacement vector in the historical motion information table, and filling the candidate motion information list based on an average of the first displacement vector and the last displacement vector; or determining the first displacement vector in the historical motion information table based on the historical motion information table, and filling the candidate motion information list based on the first displacement vector.

In some embodiments of this application, the determining the corresponding displacement vectors based on the historical motion information table, and filling a displacement vector in a prediction mode based on the displacement vectors may be implemented in the following manner:

determining a value of a horizontal direction of a first displacement vector and a value of a vertical direction of a last displacement vector in the historical motion information table based on the historical motion information table; filling a horizontal direction of the displacement vector in the prediction mode based on the value of the horizontal direction of the first displacement vector; and filling a vertical direction of the displacement vector in the prediction mode based on the value of the vertical direction of the last displacement vector. Certainly, due to the variety of video compression environments during filling, to adapt to different use environments, the method further includes: determining a value of a vertical direction of a first displacement vector and a value of a horizontal direction of a last displacement vector in the historical motion information table based on the historical motion information table; filling a vertical direction of the displacement vector in the prediction mode based on the value of the vertical direction of the first displacement vector; and filling a horizontal direction of the displacement vector in the prediction mode based on the value of the horizontal direction of the last displacement vector.

In some embodiments of this application, since the quantity of candidate displacement vectors in the historical motion information table changes dynamically with different use environments or different compression degrees, a position of a to-be-filled displacement vector in the historical motion information table may be determined when a quantity of candidate displacement vectors of the historical motion information table is greater than the index of the filling position in the candidate motion information list; and a corresponding displacement vector is determined for dynamic filling based on the position of the to-be-filled displacement vector in the intra prediction historical motion information table, where the position of the to-be-filled displacement vector in the historical motion information table is determined based on the quantity of candidate displacement vectors and the index of the filling position in the candidate motion information list. In actual implementation, when the quantity of candidate BVs cnt_hbvp_cands is greater than the index cbvp_index of the filling position in the candidate motion information list, the (cnt_hbvp_cands % (cbvp_index+1))$^{th}$ BV in the IntraHMVP is filled. In some embodiments, when the quantity of candidate displacement vectors of the historical motion information table is less than or equal to the index of the filling position in the candidate motion information list, the method for determining a candidate motion information list provided in the foregoing embodiments may be performed to implement the filling of the candidate motion information list.

Figure 9:
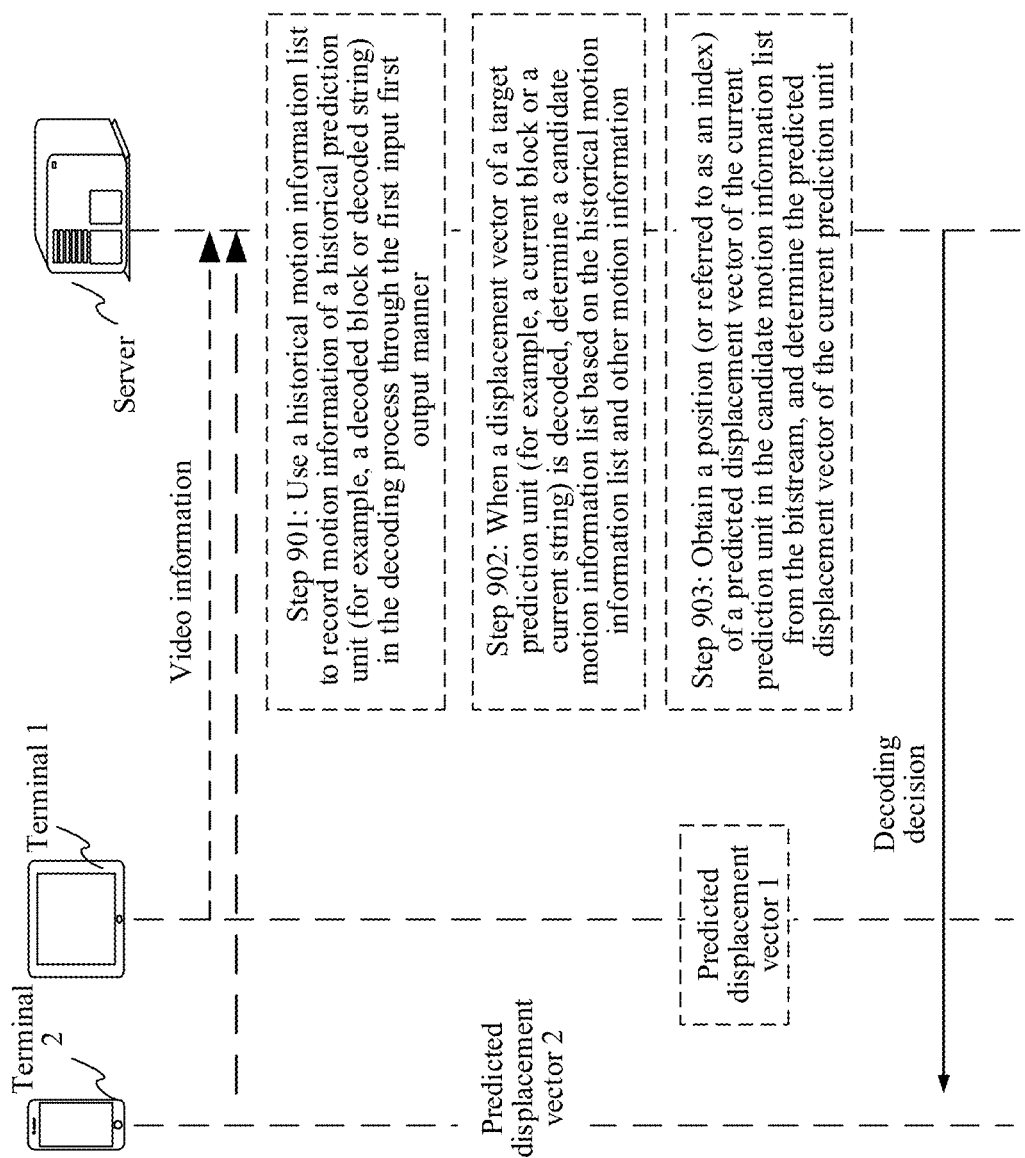
FIG. 9 is a schematic flowchart of a method for determining a candidate motion information list according to an embodiment of this application.

The method for determining a candidate motion information list provided in the embodiments of this application is described with reference to the foregoing embodiments. FIG. 9 is an exemplary schematic flowchart of a method for determining a candidate motion information list according to an embodiment of this application. It may be understood that, steps shown in FIG. 9 may be performed by various servers running the apparatus for determining a candidate motion information list, such as a dedicated terminal, a server, or a server cluster with a function of determining a candidate motion information list. The following describes the steps shown in FIG. 9.

Step 901: Use a historical motion information list to record motion information of a historical prediction unit (for example, a decoded block or decoded string) in the decoding process through the first input first output manner.

Step 902: When a displacement vector of a target prediction unit (for example, a current block or a current string) is decoded, determine a candidate motion information list based on the historical motion information list and other motion information.

Step 903: Obtain a position (or referred to as an index) of a predicted displacement vector of the current prediction unit in the candidate motion information list from the bitstream, and determine the predicted displacement vector of the current prediction unit.

Figure 10:
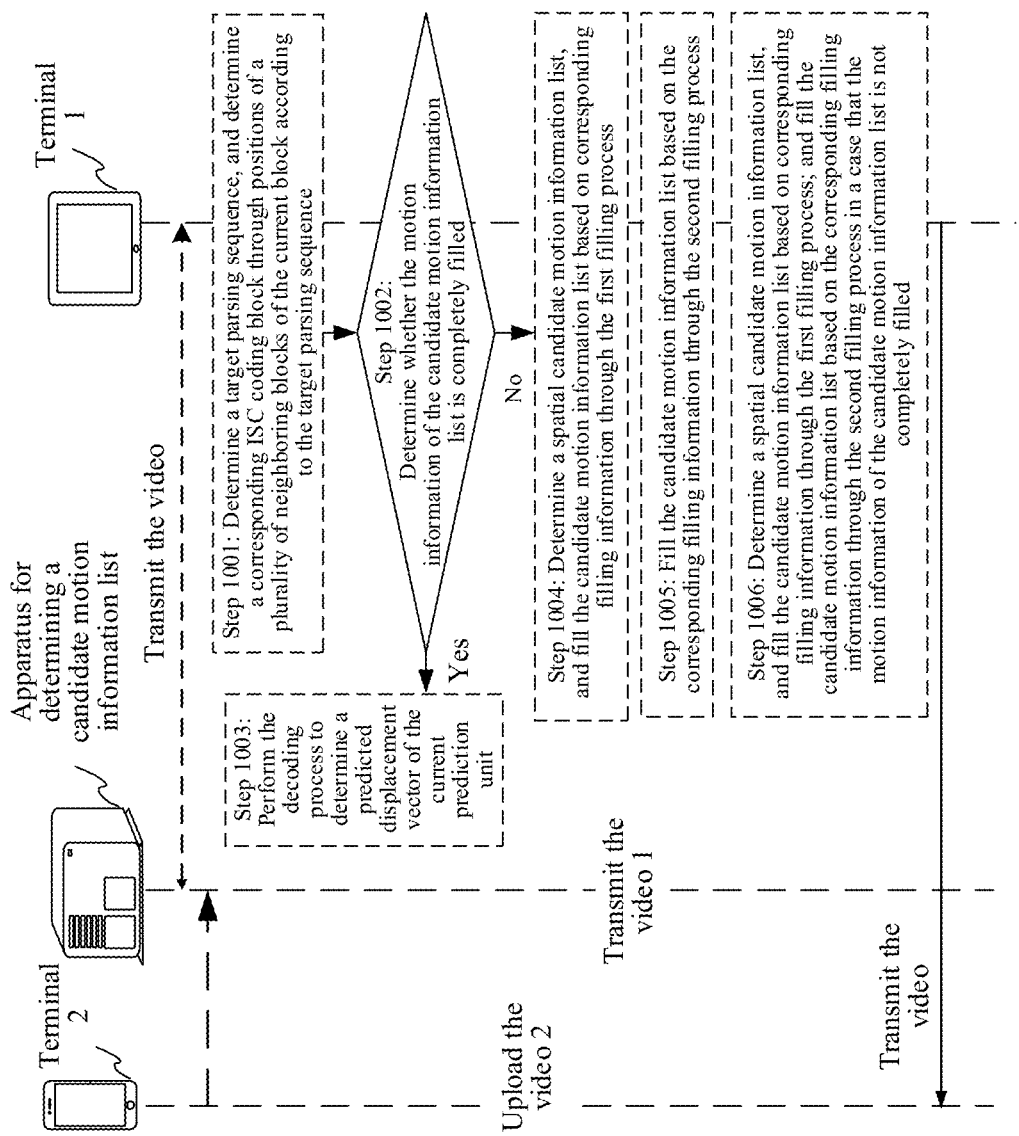
FIG. 10 is a schematic flowchart of a method for determining a candidate motion information list according to an embodiment of this application.

FIG. 10 is an exemplary schematic flowchart of a method for determining a candidate motion information list according to an embodiment of this application. In some embodiments of this application, the determining a candidate motion information list based on the historical motion information list and other motion information includes the following steps:

Step 1001: Determine a target parsing sequence, and determine a corresponding ISC coding block through positions of a plurality of neighboring blocks of the current block according to the target parsing sequence.

Figure 11:
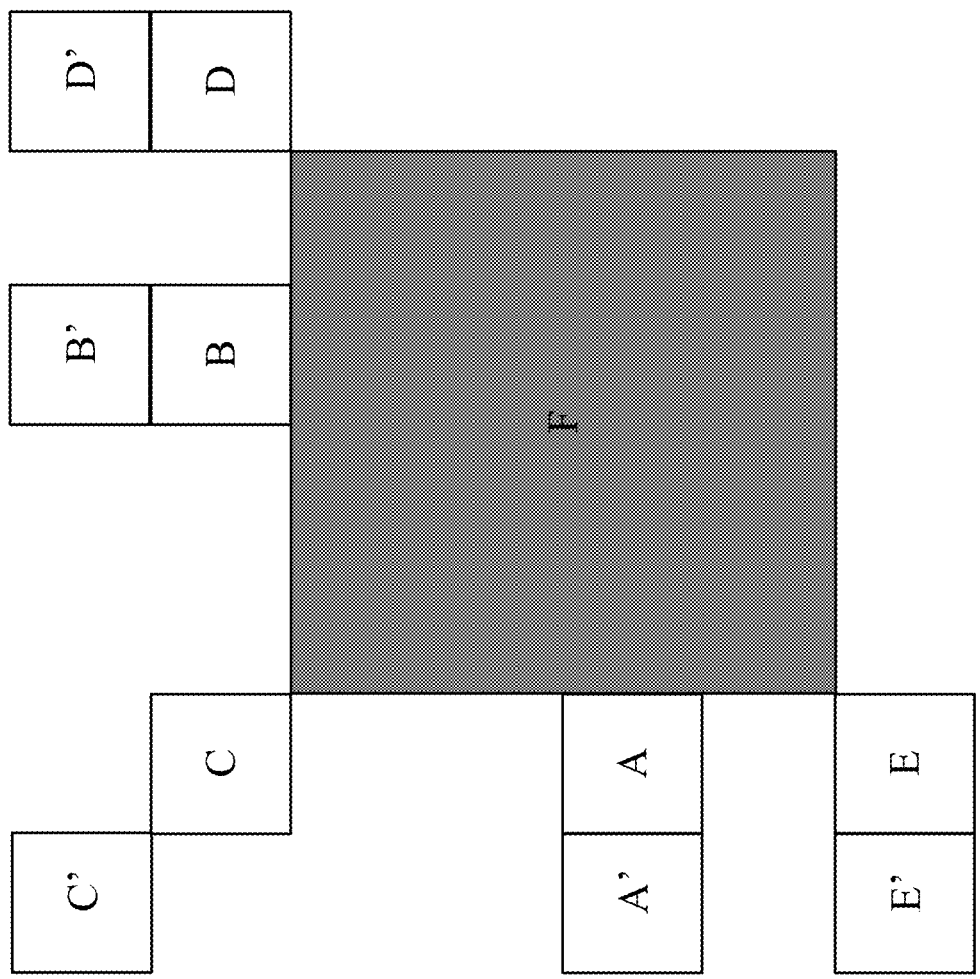
FIG. 11 is a schematic diagram of spatial neighboring blocks according to an embodiment of this application.

FIG. 11 is a schematic diagram of spatial neighboring blocks according to an embodiment of this application. The decoded ISC blocks may be found in the order of {A, B, C, D, E}, and the SV information of the neighboring ISC blocks in the spatial domain are recorded respectively. The recorded SV information may include: the first or last SV information determined by the coding block according to the target parsing sequence. In the embodiments of this application, the spatial neighboring blocks of the current codec block refer to codec blocks that belong to the same image as the current codec block and are spatially neighboring to the current codec block. The so-called "neighboring" herein may mean that the distance to the current codec block is less than a threshold, and the threshold may be set in combination with the actual situation. In addition, the calculation method of the distance between two codec blocks may also be set flexibly, for example, the distance may be the distance between the coordinates of the upper left corner of the two codec blocks, may be the distance between the abscissa (or ordinate) of the upper left corner of the two codec blocks, may be the distance between the center positions of the two codec blocks, or may be the shortest distance between the two codec blocks, which is not limited in this embodiment of this application. In an example, it is assumed that the coordinates of the upper left corner of the current codec block are (x0, y0), and the coordinates of the upper left corner of another codec block are (x1, y1). If the condition |x0−x1|<a or |y0−y1|<b is satisfied, it is determined that the other codec block is a spatial neighboring block of the current codec block. The values of a and b may or may not be equal. For example, a=b=8.

Spatial neighboring blocks include spatial neighboring blocks and spatial non-neighboring blocks. The spatial neighboring blocks of the current codec block refer to codec blocks that belong to the same image as the current codec block and are neighboring and adjacent to the current codec block in spatial position. The so-called "neighboring and adjacent" may refer to the existence of overlapping edges or vertices with the current codec block. For example, as shown in FIG. 11, the spatial neighboring blocks of the current codec block F may include codec blocks such as A, B, C, D, and E. Spatial non-neighboring blocks of the current codec block refer to codec blocks that belong to the same image as the current codec block, and are spatially neighboring to and not adjacent to the current codec block. The so-called "neighboring and not adjacent" may mean that the distance to the current codec block is less than a threshold, but there is no overlapping edge or vertex with the current codec block. For example, as shown in FIG. 11, the spatial non-neighboring blocks of the current codec block F may include codec blocks such as A', B', C', D', and E'.

In the embodiments of this application, the spatial neighboring blocks include ISC blocks, and the so-called "ISC blocks" refer to codec blocks that use the ISC prediction mode to perform motion vector prediction. In some embodiments, the spatial neighboring blocks include at least one of the following: spatial neighboring ISC blocks or spatial non-neighboring ISC blocks. The spatial neighboring ISC blocks of the current codec block refer to the spatial neighboring blocks of the current codec block, and the spatial neighboring blocks are ISC blocks. The spatially non-neighboring ISC blocks of the current codec block refer to the spatially non-neighboring blocks of the current codec block and the spatially non-neighboring blocks are ISC blocks.

In some embodiments, the spatial neighboring blocks further include IBC blocks. The so-called "IBC blocks" refer to codec blocks that use the IBC prediction mode to perform motion vector prediction. In some embodiments, the spatial neighboring blocks include at least one of the following: spatial neighboring IBC blocks or spatial non-neighboring IBC blocks. The spatial neighboring IBC blocks of the current codec block refer to the spatial neighboring blocks of the current codec block, and the spatial neighboring blocks are IBC blocks. The spatially non-neighboring IBC blocks of the current codec block refer to the spatially non-neighboring blocks of the current codec block and the spatially non-neighboring blocks are IBC blocks.

Step 1002: Determine whether the motion information of the candidate motion information list is completely filled, and if yes, perform step 1003; otherwise, perform step 1004.

Step 1003: Perform the decoding process to determine a predicted displacement vector of the current prediction unit.

Step 1004: Determine a spatial candidate motion information list, and fill the candidate motion information list based on corresponding filling information through the first filling process.

The first filling process may be used for filling based on the spatial domain motion information list.

In some embodiments of this application, the filling information may be motion information of an ISC block, including at least one of the following:

1: a SV of the first codec string determined according to a target parsing sequence in the ISC block, where the target parsing sequence may be the first target parsing sequence {A, B, C, D, E};
2: a SV of the last codec string determined according to the target parsing sequence in the ISC block;
3: an average of the SV of the first codec string and the SV of the last codec string determined according to the target parsing sequence in the ISC block;
4: a weighted average of the SV of the first codec string and the SV of the last codec string according to the target parsing sequence in the ISC block; or
5: SVs of a plurality of codec strings in the ISC block.

The motion information of the ISC block listed above is only exemplary and explanatory, and the embodiments of this application do not limit other implementations.

In some embodiments of this application, the sequence of searching for spatial neighboring blocks and non-neighboring blocks may be a third target parsing sequence {A->A', B->B', C->C', D->D', E->E'}. For each position X (including neighboring blocks and non-neighboring blocks, X=A, B, C, D, E), it is first determined whether the neighboring block X is an ISC block, and when it is determined that the neighboring block X is an ISC block, a SV corresponding to the ISC block is obtained. The next position including neighboring blocks and non-neighboring blocks is then traversed according to the target parsing sequence, until the filling is completed.

When it is determined that the neighboring block X is not an ISC block, it is determined whether X' is an ISC or IBC block, and when it is determined that the neighboring block X' is an ISC block, a SV or BV corresponding to X' is obtained; otherwise, traversing is continued according to the target parsing sequence.

In some embodiments of this application, the SV and/or BV information of the spatial non-neighboring blocks may be alternatively determined first, and the SV information of the spatial neighboring blocks may then be determined. A fourth target parsing sequence may be {A'->A, B'->B, C'->C, D'->D, E'->E}. For each position X (including neighboring blocks and non-neighboring blocks, X=A, B, C, D, E), it is first determined whether the non-neighboring block X' is an ISC or IBC block, and when it is determined that the non-neighboring block X' is an ISC block or IBC block, a corresponding SV or BV is obtained. Traversing is then performed according to the target parsing sequence; otherwise, it is determined whether the neighboring block X is an ISC block. If yes, the corresponding SV is obtained; otherwise, it is considered that the position cannot be obtained, and traversing is continued according to the target parsing sequence.

When the spatial neighboring ISC block is empty, or the SV of the spatial neighboring ISC block is unavailable, the candidate motion information list is filled based on the motion information of the decoded spatially non-neighboring IBC or ISC block.

For the positions of spatial non-neighboring IBC or ISC blocks, reference may be made to FIG. 11 and Table 1. The selection of the spatial non-neighboring blocks may be based on the second target parsing sequence {A', B', C', D', E'}. For example, based on the second target parsing sequence, the BV or ISC block of the spatial non-neighboring IBC block is used according to the first or last SV of the scanning sequence. Based on the SV information of the spatial non-neighboring ISC block, the SV information of the ISC block is used for filling, which is the same as the filling process shown in step 1004.

neig_x_pos and neig_y_pos represent the horizontal and vertical coordinates of the upper left sample of the spatial non-neighboring block respectively, cur_x_pos and cur_y_pos represent the horizontal and vertical coordinates of the upper left sample of the current block F respectively, and cu_width and cu_height represent the width and the height of the current block F respectively.

| Non-neighboring block position (corresponding to the examples in FIG. 11) | neig_x_pos | neig_y_pos |
|---|---|---|
| Left (A') | cur_x_pos − 8 | cur_y_pos + cu_height/2 |
| Up (B') | cur_x_pos + cu_width/2 | cur_y_pos − 8 |
| Upper left (C') | cur_x_pos − 8 | cur_y_pos − 8 |
| Upper right (D') | cur_x_pos + cuwidth | cur_y_pos − 8 |
| Lower left (E') | cur_x_pos − 8 | cur_y_pos + cu_height |

When it is checked that a specific spatial domain block is in ISC mode, a specified SV may be put into the candidate list, or all stored SVs may be put into the candidate list in order.

In some embodiments, when the candidate list is still not full, the candidate motion information list may be filled by (0, 0).

Step 1005: Fill the candidate motion information list based on the corresponding filling information through the second filling process.

Step 1006: Determine a spatial candidate motion information list, and fill the candidate motion information list based on corresponding filling information through the first filling process; and fill the candidate motion information list based on the corresponding filling information through the second filling process when the motion information of the candidate motion information list is not completely filled.

One of step 1004, step 1005, and step 1006 may be selected and performed.

In some embodiments of this application, when the candidate motion information list is filled based on the spatial motion vector and the historical motion information table, the filling position in the candidate motion information list may be determined first, and then the corresponding filling information may be determined. For example, the determining the filling position in the candidate motion information list may include at least one of the following:

adjusting spatial candidate motion information before historical motion information; or adjusting the spatial candidate motion information after the historical motion information, or obtaining at least one spatial neighboring or non-neighboring motion information block for filling.

In some embodiments of this application, a fixed position of the candidate motion information list may be filled with a corresponding spatial vector. For example, when a specific type of candidate motion vector from the historical motion information does not exist in the CBVP list, the spatial vector may be filled in a position of the corresponding type in the candidate motion information list in order. For example, when a candidate motion vector of an $i^{th}$ class from the historical motion information on the left/upper/upper left/upper right/lower left of the current block does not exist in the CBVP list, a spatial vector of a corresponding position (left/upper/upper left/upper right/lower left) may be filled.

In some embodiments of this application, when a spatial vector of a corresponding position also does not exist, the candidate motion information list may be filled by (0, 0) coding, or the candidate motion information list may be filled through the second filling process.

Figure 12:
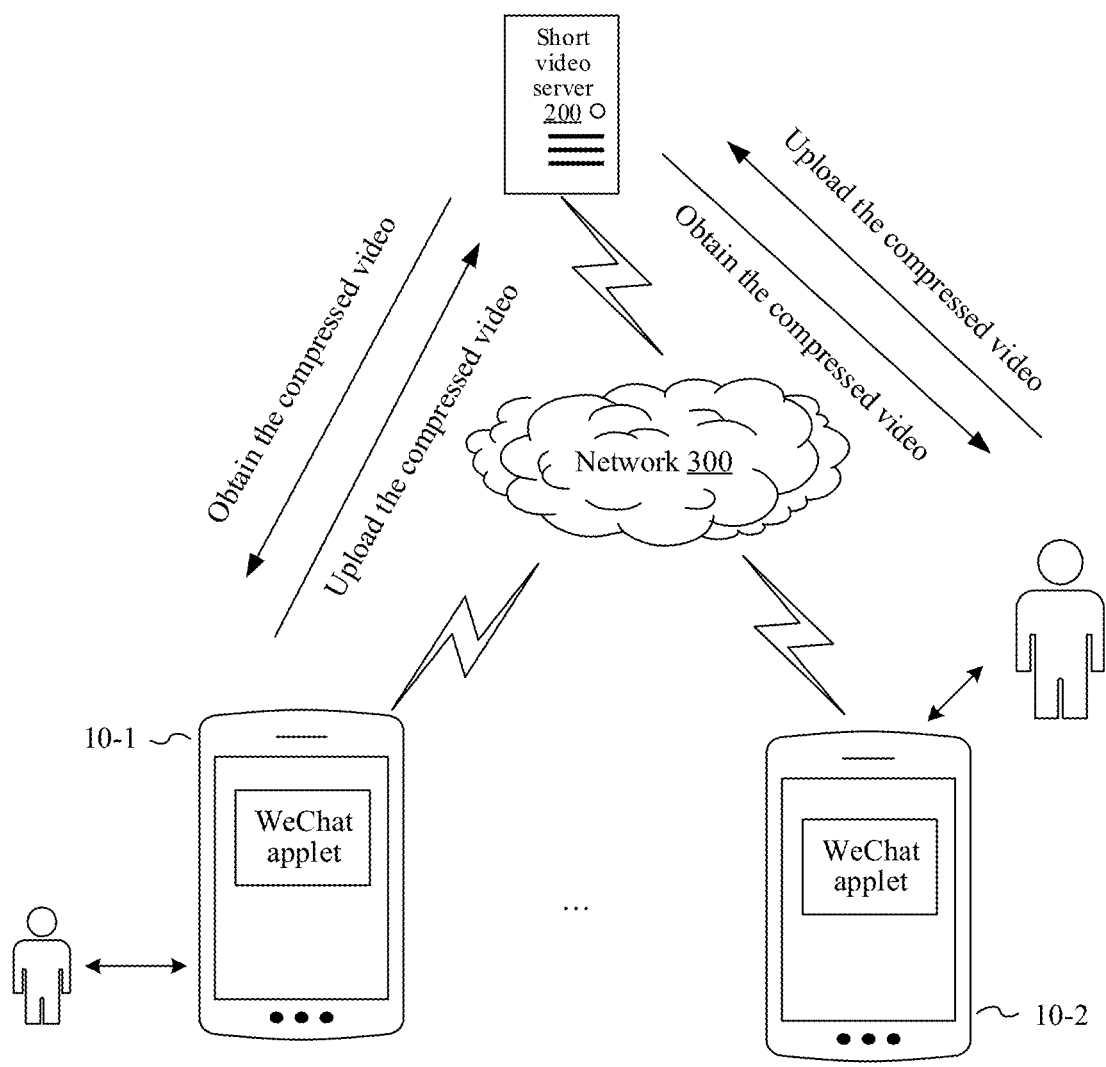
FIG. 12 is a schematic diagram of a use scenario of a method for determining a candidate motion information list according to an embodiment of this application.
Figure 13:
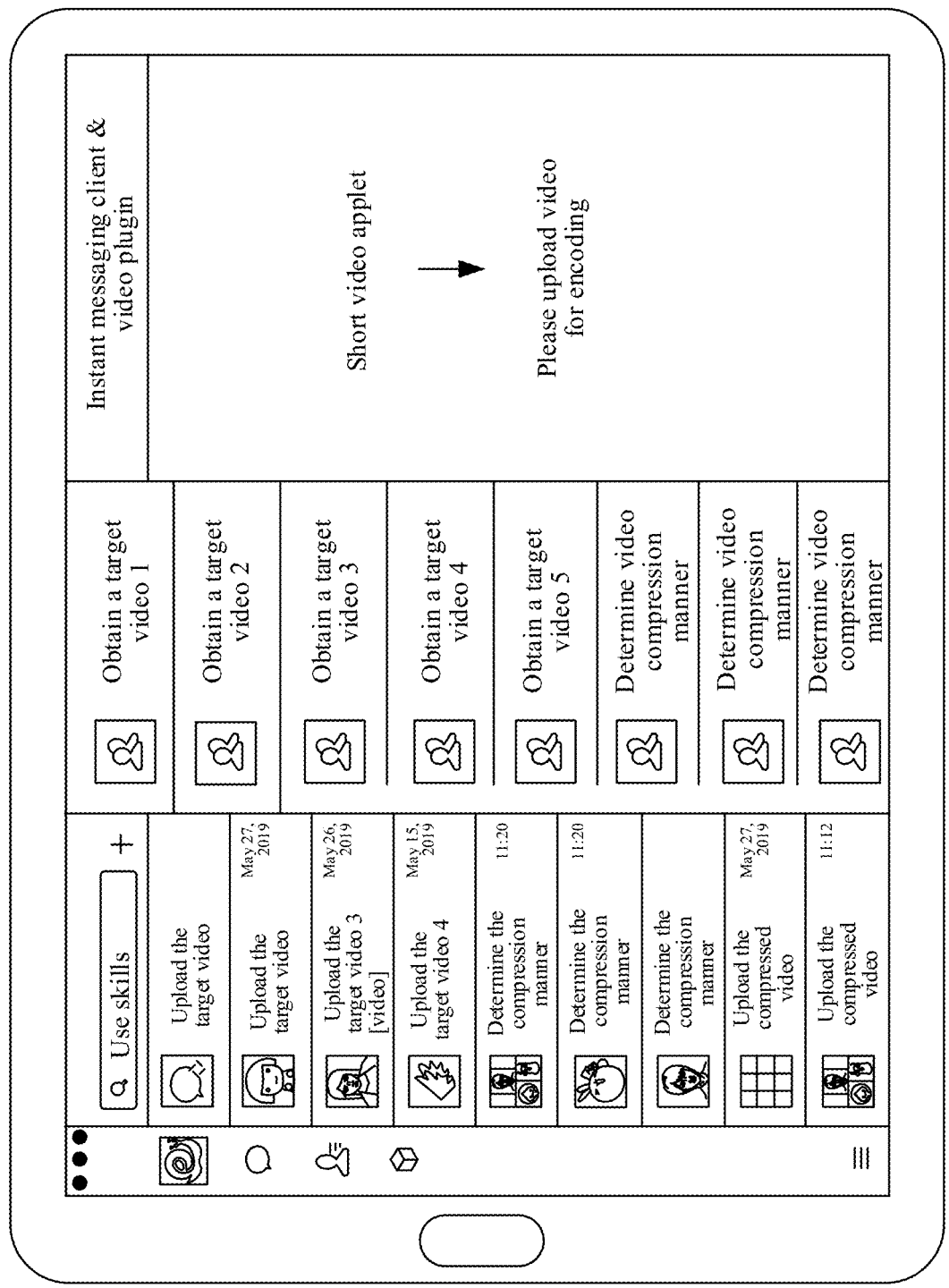
FIG. 13 is a schematic diagram of video compression according to an embodiment of this application.
Figure 14:
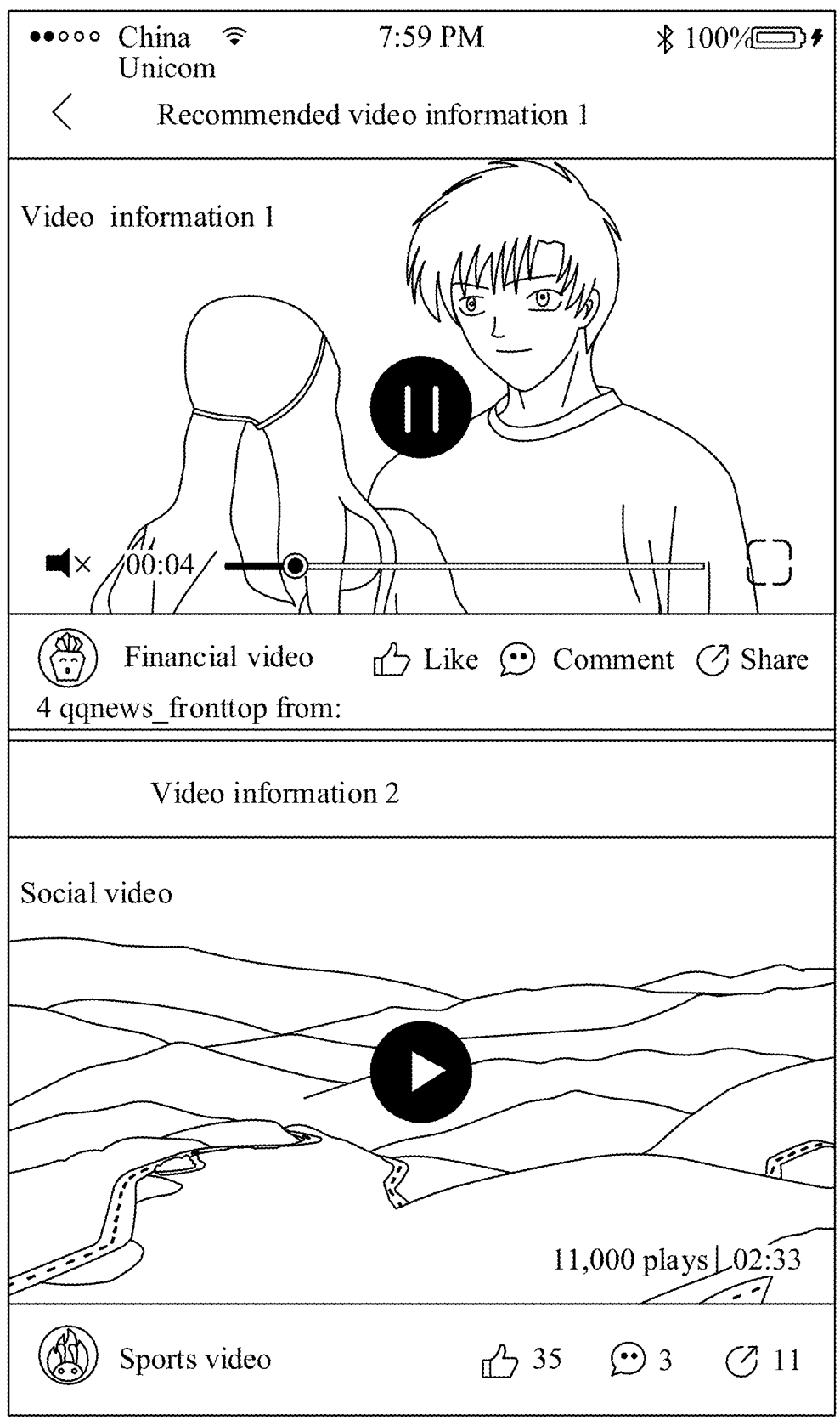
FIG. 14 is a schematic diagram displaying a compressed video according to an embodiment of this application.

The following describes the method for determining a candidate motion information list provided in this application by taking the transmission of short videos through an instant messaging client as an example. FIG. 12 is a schematic diagram of a use scenario of a method for determining a candidate motion information list according to an embodiment of this application. A video that needs to be compressed and transmitted is a short video. The terminals (including the terminal 10-1 and the terminal 10-2) are provided with a software client that can display the corresponding short video, such as a client or plugin for short video playback. The user may obtain a target video through the corresponding client for display. The terminal is connected to the short video server 200 through the network 300. The network 300 may be a wide area network, a local area network, or a combination of the wide area network and the local area network, and achieves data transmission by using a radio link. Certainly, the user may alternatively upload videos through the WeChat applets in the terminal for other users in the network to watch. In this process, the terminal needs to compress the videos to be uploaded, or the server compresses the stored videos to reduce the transmission time, thereby reducing the storage space occupied and improve the video compression efficiency. FIG. 13 is an exemplary schematic diagram of video compression according to an embodiment of this application. The user compresses a target video to be processed through the compression plugin of the instant messaging client, and the method for determining a candidate motion information list provided in this application may be stored in the plugin of the instant messaging client through a corresponding storage medium for the user to call. FIG. 14 is an exemplary schematic diagram displaying a compressed video according to an embodiment of this application. When the user obtains the video information saved by the server through the video client, the server may compress the target video to be transmitted through the method for determining a candidate motion information list provided in this application, to reduce the transmission time of the target video and reduce the storage space occupied by the target video.

Figure 15:
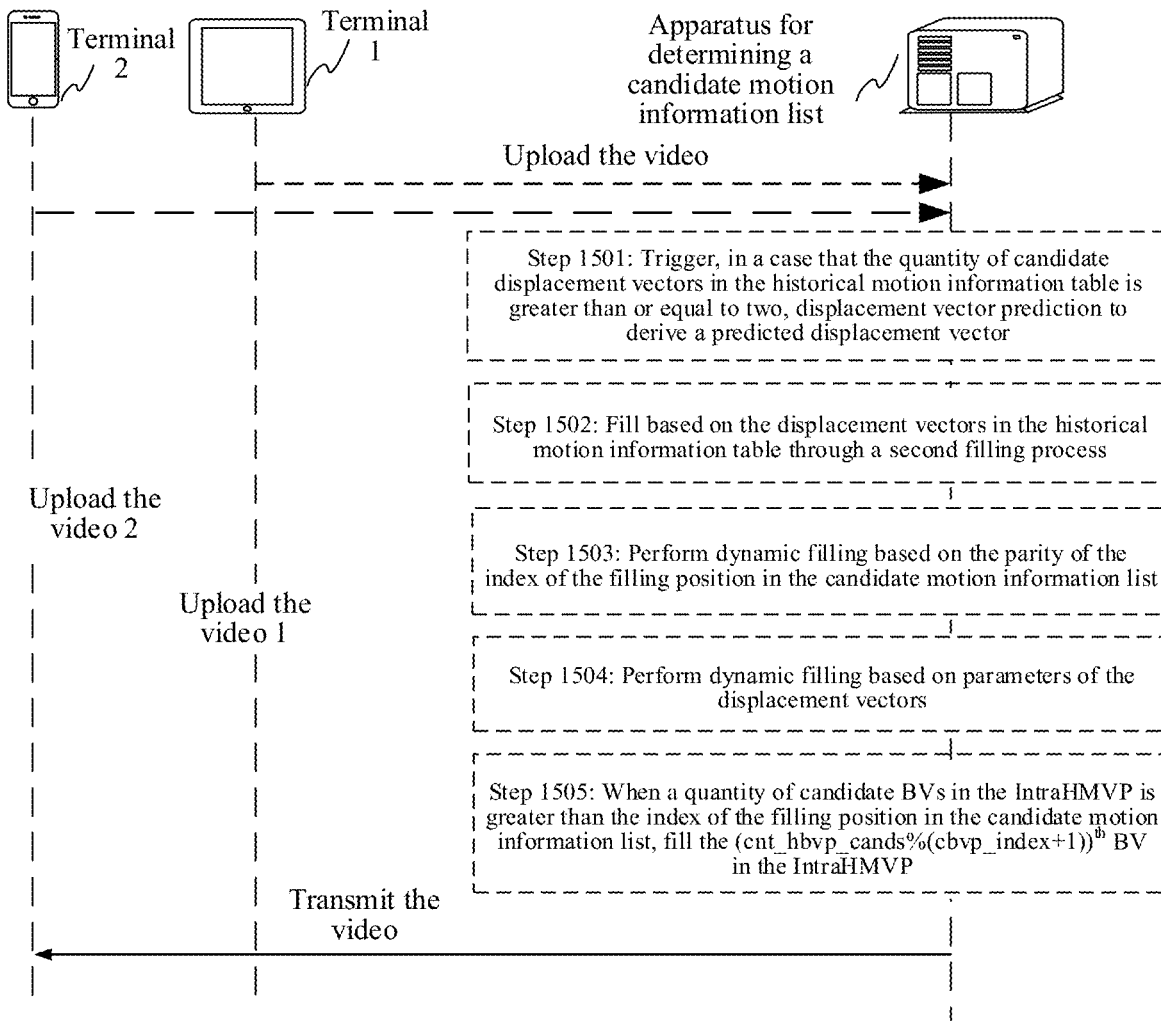
FIG. 15 is a schematic flowchart of a method for determining a candidate motion information list according to an embodiment of this application.

FIG. 15 is an exemplary schematic flowchart of a method for determining a candidate motion information list according to an embodiment of this application. In some embodiments of this application, the target video may be compressed only through the first filling process, only through the second filling process, and using the first filling process and the second filling process in combination.

In the short video compression process, the historical motion information table is an intra prediction historical motion information table to realize the processing in the intra prediction process. The filling the candidate motion information list by using the intra prediction historical motion information table may include the following steps:

Step 1501: Trigger, when the quantity of candidate displacement vectors in the historical motion information table is greater than or equal to two, displacement vector prediction to derive a predicted displacement vector.

When the quantity of candidate displacement vectors in the intra prediction historical motion information table is less than two, it is not necessary to encode the index of the category corresponding to the optimal candidate BV in the CBVP list in the bitstream.

Step 1502: Fill based on the displacement vectors in the historical motion information table through a second filling process.

In some embodiments of this application, the average of the first and last candidate BVs in the historical motion information table IntraHMVP may be filled; or the weighted average of the first and last candidate BVs in the historical motion information table IntraHMVP may be filled; or the first BV in the historical motion information table IntraHMVP may be filled.

Step 1503: Perform dynamic filling based on the parity of the index of the filling position in the candidate motion information list.

In some embodiments of this application, when the index cbvp_index of the filling position in the candidate motion information list is an odd number, the average of the first and last candidate BVs in the historical motion information table IntraHMVP is filled; otherwise, the first BV in the historical motion information table IntraHMVP is filled.

In some embodiments of this application, when the index cbvp_index of the filling position in the candidate motion information list is an even number, the average of the first and last candidate BVs in the IntraHMVP is filled; otherwise the first BV in the IntraHMVP is filled.

Step 1504: Perform dynamic filling based on parameters of the displacement vectors.

In some embodiments of this application, a value of a horizontal direction of the first BV in IntraHMVP may be filled in the block vector horizontal direction, and a value of a vertical direction of the last BV in the IntraHMVP may be filled in the block vector vertical direction. Alternatively, a value of a horizontal direction of the last BV in IntraHMVP is filled in the block vector horizontal direction, and a value of a vertical direction of the first BV in the IntraHMVP is filled in the block vector vertical direction.

Step 1505: When a quantity of candidate BVs in the IntraHMVP is greater than the index of the filling position in the candidate motion information list, fill the (cnt_hbvp_cands % (cbvp_index+1))$^{th}$ BV in the IntraHMVP.

Since the quantity of candidate BVs in IntraHMVP changes dynamically with the video compression, when a quantity of candidate BVs in the IntraHMVP is greater than the index of the filling position in the candidate motion information list, the (cnt_hbvp_cands % (cbvp_index+1))$^{th}$ BV in the IntraHMVP may be filled; Otherwise, one of steps 1502 to 1504 in the foregoing embodiments may be selected and performed.

The embodiments of this application have the following beneficial effects:

In the embodiments of this application, the target motion information list and a quantity of displacement vectors in the intra prediction historical motion information table are determined; and when the target motion information list is not full, at least one piece of motion information is obtained based on the intra prediction historical motion information table, and the candidate motion information list is filled based on the at least one piece of motion information, the candidate motion information list being used for providing candidate predicted displacement vectors for a current codec block. In this way, more and more effective displacement vectors can be provided in the candidate motion information list, to obtain a better displacement vector prediction effect, improve the video compression performance, and improve the user experience.

The foregoing descriptions are merely preferred embodiments of this application, but are not intended to limit this application. Any modification, equivalent replacement and improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for determining a candidate motion information list for a current codec block, comprising:

constructing a spatial domain motion information list, wherein the spatial domain motion information list comprises motion information of a spatial neighboring block of the current codec block, and the spatial neighboring block comprises at least an ISC block;

obtaining, when the candidate motion information list has no sufficient motion information, at least one piece of motion information from the spatial domain motion information list, and filling the candidate motion information list using the at least one piece of motion information through a first filling process;

when the candidate motion information list is not completely filled after the first filling process, determining a historical motion information table for the current codec block, the historical motion information table being used for at least one of inter prediction, intra prediction, intra block copy (IBC) prediction, or intra string copy (ISC) prediction; and obtaining at least one piece of motion information based on the historical motion information table, and filling the candidate motion information list based on the at least one piece of motion information through a second filling process, the candidate motion information list being used for providing candidate predicted displacement vectors for the current codec block, further including:

obtaining a quantity of displacement vectors in the historical motion information table; and when the quantity of displacement vectors in the historical motion information table is greater than or equal to two, deriving a displacement vector from a weighted average of at least two displacement vectors in the historical motion information table and filling the candidate motion information list with the derived displacement vector.

2. The method according to claim 1, wherein the obtaining at least one piece of motion information based on the historical motion information table, and filling the candidate motion information list based on the at least one piece of motion information comprises:

determining corresponding displacement vectors based on the historical motion information table, and filling the candidate motion information list based on the displacement vectors; or performing dynamic filling based on parity of an index of a filling position in the candidate motion information list; or determining the corresponding displacement vectors based on the historical motion information table, and filling a displacement vector in a prediction mode based on the displacement vectors, to implement filling of the candidate motion information list; or determining the corresponding displacement vectors based on the historical motion information table, and performing dynamic filling based on a quantity of the displacement vectors and the index of the filling position in the candidate motion information list.

3. The method according to claim 2, wherein the performing dynamic filling based on parity of an index of a filling position in the candidate motion information list comprises:
   determining, when the index of the filling position in the candidate motion information list is an odd number, a first displacement vector and a last displacement vector in the historical motion information table, and filling the candidate motion information list based on an average of the first displacement vector and the last displacement vector; or
   determining the first displacement vector in the historical motion information table based on the historical motion information table, and filling the candidate motion information list based on the first displacement vector.

4. The method according to claim 2, wherein the performing dynamic filling based on parity of an index of a filling position in the candidate motion information list comprises:
   determining, when the index of the filling position in the candidate motion information list is an even number, a first displacement vector and a last displacement vector in the historical motion information table, and filling the candidate motion information list based on an average of the first displacement vector and the last displacement vector; or
   determining the first displacement vector in the historical motion information table based on the historical motion information table, and filling the candidate motion information list based on the first displacement vector.

5. The method according to claim 2, wherein the determining the corresponding displacement vectors based on the historical motion information table, and filling a displacement vector in a prediction mode based on the displacement vectors comprises:
   determining a value of a horizontal direction of a first displacement vector and a value of a vertical direction of a last displacement vector in the historical motion information table based on the historical motion information table;
   filling a horizontal direction of the displacement vector in the prediction mode based on the value of the horizontal direction of the first displacement vector; and
   filling a vertical direction of the displacement vector in the prediction mode based on the value of the vertical direction of the last displacement vector.

6. The method according to claim 2, wherein the determining the corresponding displacement vectors based on the historical motion information table, and filling a displacement vector in a prediction mode based on the displacement vectors comprises:
   determining a value of a vertical direction of a first displacement vector and a value of a horizontal direction of a last displacement vector in the historical motion information table based on the historical motion information table;
   filling a vertical direction of the displacement vector in the prediction mode based on the value of the vertical direction of the first displacement vector; and
   filling a horizontal direction of the displacement vector in the prediction mode based on the value of the horizontal direction of the last displacement vector.

7. The method according to claim 2, wherein the performing dynamic filling based on a quantity of the displacement vectors and the index of the filling position in the candidate motion information list comprises:
   determining a position of a to-be-filled displacement vector in the historical motion information table when a quantity of candidate displacement vectors of the historical motion information table is greater than the index of the filling position in the candidate motion information list; and
   determining a corresponding displacement vector for dynamic filling based on the position of the to-be-filled displacement vector in the historical motion information table, wherein the position of the to-be-filled displacement vector in the historical motion information table is determined based on the quantity of candidate displacement vectors and the index of the filling position in the candidate motion information list.

8. An electronic device, comprising:
   a memory, configured to store executable instructions; and
   a processor, configured to implement, when executing the executable instructions stored in the memory, a method for determining a candidate motion information list for a current codec block, the method including:
   constructing a spatial domain motion information list, wherein the spatial domain motion information list comprises motion information of a spatial neighboring block of the current codec block, and the spatial neighboring block comprises at least an ISC block;
   obtaining, when the candidate motion information list has no sufficient motion information, at least one piece of motion information from the spatial domain motion information list, and filling the candidate motion information list using the at least one piece of motion information through a first filling process;
   when the candidate motion information list is not completely filled after the first filling process,
   determining a historical motion information table for the current codec block, the historical motion information table being used for at least one of inter prediction, intra prediction, intra block copy (IBC) prediction, or intra string copy (ISC) prediction; and
   obtaining at least one piece of motion information based on the historical motion information table, and filling the candidate motion information list based on the at least one piece of motion information through a second filling process, the candidate motion information list being used for providing candidate predicted displacement vectors for the current codec block, further comprising:
   obtaining a quantity of displacement vectors in the historical motion information table; and
   when the quantity of displacement vectors in the historical motion information table is greater than or equal to two, deriving a displacement vector from a weighted average of at least two displacement vectors in the historical motion information table and filling the candidate motion information list with the derived displacement vector.

9. The electronic device according to claim 8, wherein the obtaining at least one piece of motion information based on the historical motion information table, and filling the candidate motion information list based on the at least one piece of motion information comprises:
   determining corresponding displacement vectors based on the historical motion information table, and filling the candidate motion information list based on the displacement vectors; or
   performing dynamic filling based on parity of an index of a filling position in the candidate motion information list; or
   determining the corresponding displacement vectors based on the historical motion information table, and filling a displacement vector in a prediction mode based on the displacement vectors, to implement filling of the candidate motion information list; or determining the corresponding displacement vectors based on the historical motion information table, and performing dynamic filling based on a quantity of the displacement vectors and the index of the filling position in the candidate motion information list.

10. The electronic device according to claim 9, wherein the performing dynamic filling based on parity of an index of a filling position in the candidate motion information list comprises:

determining, when the index of the filling position in the candidate motion information list is an odd number, a first displacement vector and a last displacement vector in the historical motion information table, and filling the candidate motion information list based on an average of the first displacement vector and the last displacement vector; or determining the first displacement vector in the historical motion information table based on the historical motion information table, and filling the candidate motion information list based on the first displacement vector.

11. The electronic device according to claim 9, wherein the performing dynamic filling based on parity of an index of a filling position in the candidate motion information list comprises:

determining, when the index of the filling position in the candidate motion information list is an even number, a first displacement vector and a last displacement vector in the historical motion information table, and filling the candidate motion information list based on an average of the first displacement vector and the last displacement vector; or determining the first displacement vector in the historical motion information table based on the historical motion information table, and filling the candidate motion information list based on the first displacement vector.

12. The electronic device according to claim 9, wherein the determining the corresponding displacement vectors based on the historical motion information table, and filling a displacement vector in a prediction mode based on the displacement vectors comprises:

determining a value of a horizontal direction of a first displacement vector and a value of a vertical direction of a last displacement vector in the historical motion information table based on the historical motion information table;

filling a horizontal direction of the displacement vector in the prediction mode based on the value of the horizontal direction of the first displacement vector; and filling a vertical direction of the displacement vector in the prediction mode based on the value of the vertical direction of the last displacement vector.

13. The electronic device according to claim 9, wherein the determining the corresponding displacement vectors based on the historical motion information table, and filling a displacement vector in a prediction mode based on the displacement vectors comprises:

determining a value of a vertical direction of a first displacement vector and a value of a horizontal direction of a last displacement vector in the historical motion information table based on the historical motion information table;

filling a vertical direction of the displacement vector in the prediction mode based on the value of the vertical direction of the first displacement vector; and filling a horizontal direction of the displacement vector in the prediction mode based on the value of the horizontal direction of the last displacement vector.

14. The electronic device according to claim 9, wherein the performing dynamic filling based on a quantity of the displacement vectors and the index of the filling position in the candidate motion information list comprises:

determining a position of a to-be-filled displacement vector in the historical motion information table when a quantity of candidate displacement vectors of the historical motion information table is greater than the index of the filling position in the candidate motion information list; and determining a corresponding displacement vector for dynamic filling based on the position of the to-be-filled displacement vector in the historical motion information table, wherein the position of the to-be-filled displacement vector in the historical motion information table is determined based on the quantity of candidate displacement vectors and the index of the filling position in the candidate motion information list.

15. A non-transitory computer-readable storage medium, storing executable instructions, the executable instructions, when executed by a processor of an electronic device, causing the electronic device to implement a method for determining a candidate motion information list for a current codec block, the method including:

constructing a spatial domain motion information list, wherein the spatial domain motion information list comprises motion information of a spatial neighboring block of the current codec block, and the spatial neighboring block comprises at least an ISC block;

obtaining, when the candidate motion information list has no sufficient motion information, at least one piece of motion information from the spatial domain motion information list, and filling the candidate motion information list using the at least one piece of motion information through a first filling process;

when the candidate motion information list is not completely filled after the first filling process, determining a historical motion information table for the current codec block, the historical motion information table being used for at least one of inter prediction, intra prediction, intra block copy (IBC) prediction, or intra string copy (ISC) prediction; and obtaining at least one piece of motion information based on the historical motion information table, and filling the candidate motion information list based on the at least one piece of motion information through a second filling process, the candidate motion information list being used for providing candidate predicted displacement vectors for the current codec block, further comprising:

obtaining a quantity of displacement vectors in the historical motion information table; and when the quantity of displacement vectors in the historical motion information table is greater than or equal to two, deriving a displacement vector from a weighted average of at least two displacement vectors in the historical motion information table and filling the candidate motion information list with the derived displacement vector.

16. The non-transitory computer-readable storage medium according to claim 15, wherein the obtaining at least one piece of motion information based on the historical motion information table, and filling the candidate motion information list based on the at least one piece of motion information comprises:
- determining corresponding displacement vectors based on the historical motion information table, and filling the candidate motion information list based on the displacement vectors; or
- performing dynamic filling based on parity of an index of a filling position in the candidate motion information list; or
- determining the corresponding displacement vectors based on the historical motion information table, and filling a displacement vector in a prediction mode based on the displacement vectors, to implement filling of the candidate motion information list; or
- determining the corresponding displacement vectors based on the historical motion information table, and performing dynamic filling based on a quantity of the displacement vectors and the index of the filling position in the candidate motion information list.

* * * * *